(12) United States Patent
Scott

(10) Patent No.: US 7,062,717 B2
(45) Date of Patent: Jun. 13, 2006

(54) METHOD AND DEVICE FOR NAVIGATING FUNCTIONAL DISPLAY REGIONS OF A GRAPHICAL DISPLAY

(75) Inventor: Johan Scott, Linkoping (SE)

(73) Assignee: Nokia Corporation, Espoo (FI)

( * ) Notice: Subject to any disclaimer, the term of this patent is extended or adjusted under 35 U.S.C. 154(b) by 481 days.

(21) Appl. No.: 09/747,495

(22) Filed: Dec. 21, 2000

(65) Prior Publication Data

US 2001/0017634 A1    Aug. 30, 2001

(30) Foreign Application Priority Data

Dec. 30, 1999    (GB) .................................... 9930836

(51) Int. Cl.
*G06F 3/00* (2006.01)
*G06F 17/00* (2006.01)
*G06F 9/00* (2006.01)
*G11B 27/00* (2006.01)
*H04N 5/44* (2006.01)

(52) U.S. Cl. .................. 715/767; 715/720; 715/831

(58) Field of Classification Search ................ 345/858, 345/716, 160, 767, 821, 823, 817, 818, 819, 345/820, 822, 829, 831, 812, 800, 840, 846, 345/835; 725/52, 51, 60; 715/760, 719, 715/720; 348/4.05, 25, 114
See application file for complete search history.

(56) References Cited

U.S. PATENT DOCUMENTS

| | | | |
|---|---|---|---|
| 5,510,811 A * | 4/1996 | Tobey et al. ................. | 345/157 |
| 5,682,511 A | 10/1997 | Sposato et al. | |
| 5,845,299 A * | 12/1998 | Arora et al. ................. | 715/513 |
| 6,034,684 A * | 3/2000 | Proehl et al. ................ | 345/764 |
| 6,034,689 A * | 3/2000 | White et al. ................. | 345/854 |
| 6,072,485 A | 6/2000 | Barnes et al. | |
| 6,137,487 A * | 10/2000 | Mantha ........................ | 345/767 |
| 6,285,374 B1 * | 9/2001 | Falcon ......................... | 345/856 |
| 6,317,885 B1 * | 11/2001 | Fries ............................ | 725/109 |
| 6,339,440 B1 * | 1/2002 | Becker et al. .............. | 345/858 |
| 6,421,828 B1 * | 7/2002 | Wakisaka et al. ............. | 725/52 |

\* cited by examiner

FOREIGN PATENT DOCUMENTS

| | | |
|---|---|---|
| WO | 9412927 | 6/1994 |
| WO | 0016187 | 3/2000 |
| WO | 0144914 | 6/2001 |

OTHER PUBLICATIONS

European Patent Office Search Report dated Jun. 18, 2002 (3pp).
"*MPEG Menu Manager*," IBM Technical Disclosure Bulletin, vol. 38, No. 9, Sep. 1995, Armonk, New York, USA, pp. 291-295.

*Primary Examiner*—John Cabeca
*Assistant Examiner*—Blaine Basom
(74) *Attorney, Agent, or Firm*—Alfred A. Fressola; Ware, Fressola, Van Der Sluys & Adolphson LLP

(57) ABSTRACT

Digital television allows access to the Internet. However, arrow keys on a remote control are not suited for navigating web pages containing non-uniformly spaced selectable hypertext links. A web-browser or operating system window manager may be modified to allow movement of a focus along a co-ordinate system defined by the arrow keys on the remote control and to permit the focus to be positioned in-between the links. Thus, movement of the focus from one link to another is intuitive and predictable.

57 Claims, 18 Drawing Sheets

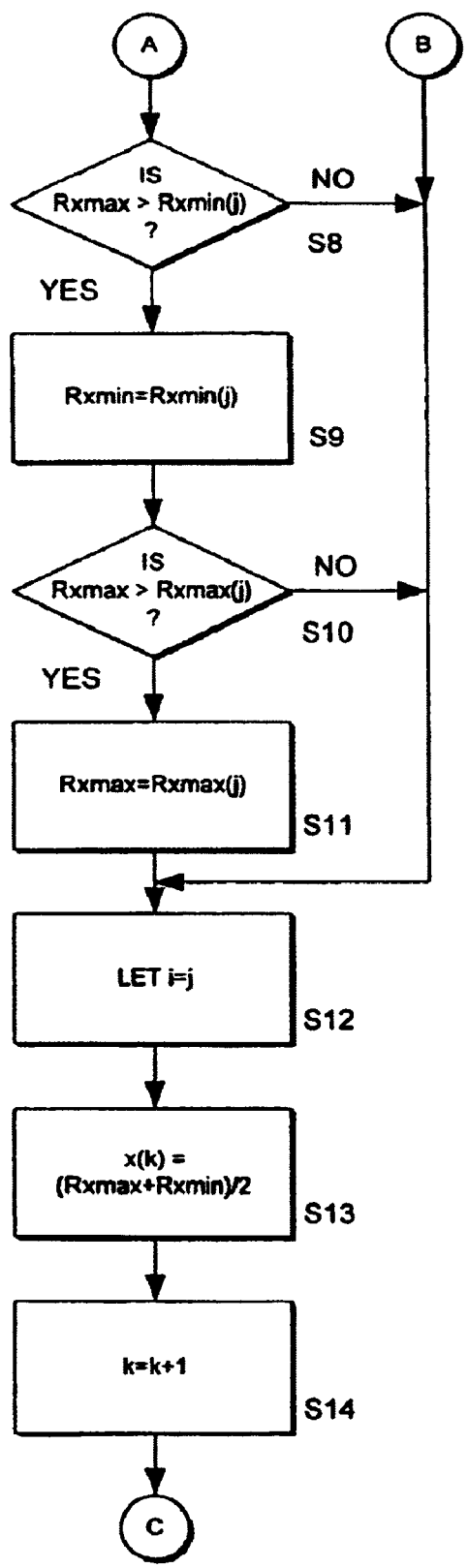
Figure 10 (Continue)

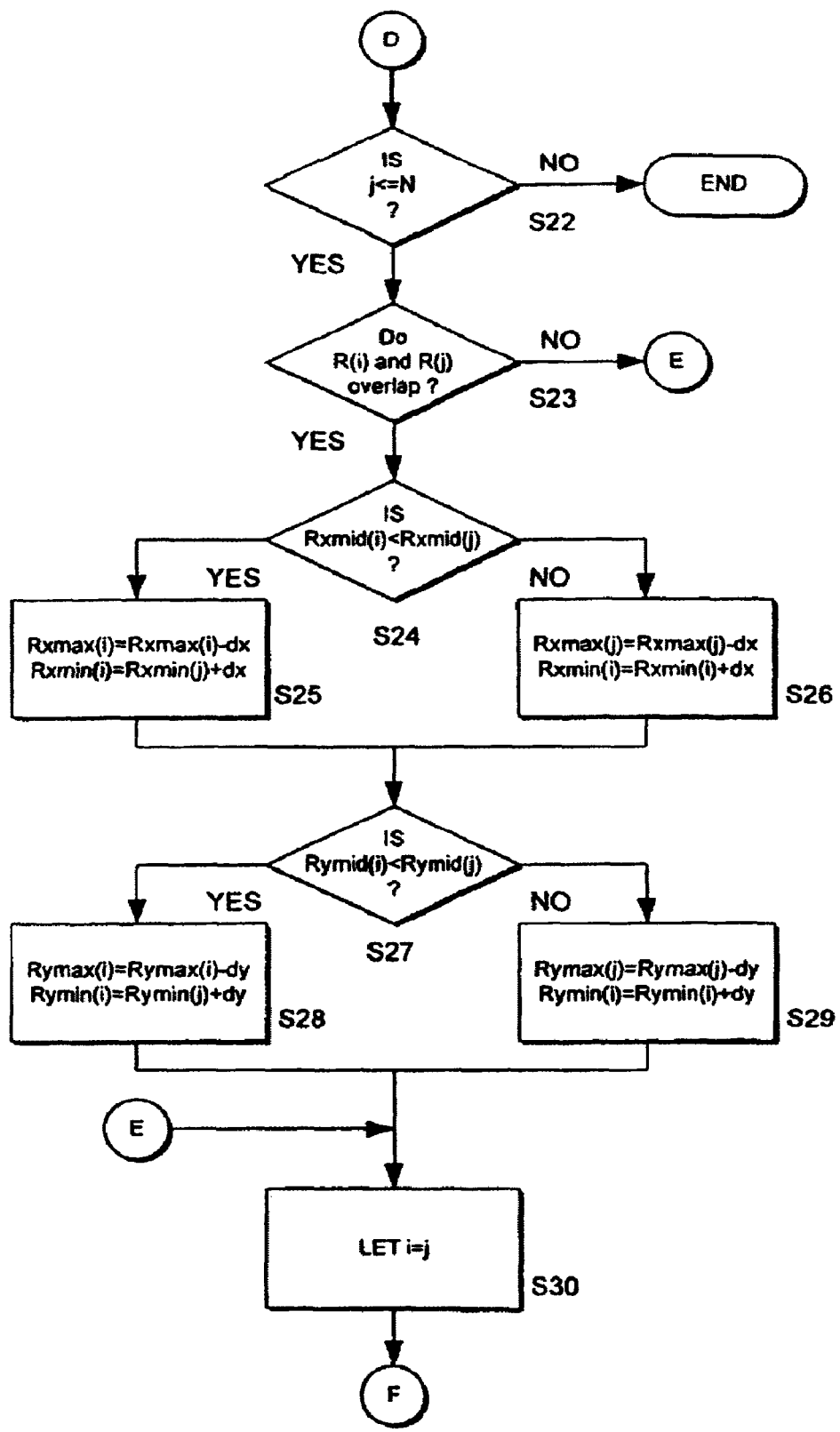
Figure 12 (Continue)

METHOD AND DEVICE FOR NAVIGATING FUNCTIONAL DISPLAY REGIONS OF A GRAPHICAL DISPLAY

FIELD OF THE INVENTION

The present invention relates to display devices and has particular but not exclusive application to multimedia network terminals.

BACKGROUND OF THE INVENTION

A number of electronic devices have graphical user interfaces (GUIs). Such devices include, for example, personal computers (PC), televisions and mobile telephones. The user may interact with the device via the GUI using a user interface, for instance a touch sensitive pad, a keyboard, a mouse or a joystick. Many factors determine the most appropriate choice of user interface for a device, such as ease and speed of operation and the environment in which the device is used. The use of a mouse is suited to the selection of icons when using a desk-top personal computer, however it is not so useful when used to make selections when using a digital television set. For this, a remote control unit having several keys is most convenient.

However, there are problems with using a key- or button-based control units as will now be explained with reference to digital television.

Digital television provides a variety of new services as compared with analogue television. It allows the user to transmit and receive signals via a set-top box and to interact with service providers. The user may now access the Internet in a similar way that is already available on a PC. For example, a user may navigate web pages by selecting hypertext links. The process of selecting a particular link involves moving a focus between links and activating selection. In a PC-based system, this process is realised by positioning a mouse pointer over the link and pressing the mouse button. To indicate that the focus has moved to the link, the shape of the mouse pointer changes or the link is highlighted, for instance, by changing colour.

The set-top box/television system is controlled using a remote control unit, which is similar to that used with present analogue televisions. The remote control is usually provided with a set of arrow keys—up, down, right, left—allowing orthogonal movement about a menu.

Such a remote control unit provides a satisfactory means for selecting elements of the menu if the menu is arranged as a rectangular array along co-ordinates defined by the keys on the remote control. Elements in a column are selected by the use of up and down buttons, while elements along a row may be selected by use of right and left keys. Thus, movement from one element to another is intuitive and reversible.

However, such a remote control unit is not suited to the selection of non-regularly positioned elements, such as links in a web page. Hypertext links may be represented by text or images and are located on the page according to as and when they are needed. Thus, it is most unusual for links to be arranged in a periodic array. If the focus is set on a highlighted link and there is no other link in the same row, pressing the right button on the remote control may result in an unexpected selection. Even more irksome is that subsequently pressing the left arrow key does not return the focus back to the original highlighted link, but to an entirely new link. Thus, movement from one element to another is non-intuitive and may be non-reversible.

The present invention seeks to solve this problem.

SUMMARY OF THE INVENTION

According to the present invention there is provided a generating device configured to generate signals for a graphical display in which a focus can be navigated between spaced, functional display regions such that they are individually selected when the focus is moved thereto, with a plurality of spaced nodes configured so that the focus makes a step movement from one node to another thereof in response to user actuation, the nodes being arranged in a mesh at the intersections of a first set of spaced lines extending a first predetermined direction and a second set of spaced lines extending in a predetermined second transverse direction, the functional regions being irregularly disposed in the display and at least one of the nodes being disposed at each of the regions respectively.

The device may include a user operable navigation control device to provide said user actuation to move the focus from one of said nodes to a next another one thereof in the mesh, the navigation device including a first control to move the focus in said first predetermined direction and second control to move the focus in the second predetermined direction.

At least one of the nodes may be disposed outside of the regions.

The first set of spaced lines may be non-equally spaced.

The functional display region may be associated with a region displayed on the graphical display.

The device may be coupled to a display device to provide the graphical display.

The device may be included in a multimedia network terminal, a set top box, a mobile station or a personal computer.

The display may further include additional nodes arranged on another mesh at the intersections of a third set of spaced lines extending a third predetermined direction and a fourth set of spaced lines extending in a predetermined fourth transverse direction, the focus being navigable between said meshes. Said other mesh may overlie or underlie said mesh. The third predetermined direction may be the same as the first predetermined direction and the fourth predetermined direction may be the same as the second predetermined direction.

The device may further include a node disposed on a handle of a scroll bar so as to allow scrolling of a page and permit selection of functional display regions not presently displayed.

A method of navigating a focus between spaced, functional display regions generated by the device may comprise inputting into the user operable navigation device a movement command corresponding to movement along the first predetermined direction and stepping the focus from a first spaced node to a second spaced node displaced from the first node along the first predetermined direction.

The method of navigating a focus from said mesh to said other mesh in the device may comprise navigating the focus to a node on said mesh adjacent to said other mesh and inputting into the user operable navigation device a movement command corresponding to movement off said mesh in the direction of said other mesh.

The method of navigating a focus from said mesh and onto said node in the device may comprise navigating the focus to a node on said mesh adjacent to node disposed on the handle of a scroll bar and inputting into the user operable navigation device a movement command corresponding to movement off said mesh and onto said node disposed on the handle of the scroll bar.

According to the present invention there is also provided a method of configuring a mesh, the method comprising determining minimum and maximum co-ordinate values along a predetermined direction for a first functional display region, determining minimum and maximum co-ordinate values along a predetermined direction for a second functional display region, obtaining an intermediate co-ordinate value in dependence on said values and providing a mesh line defined by said median co-ordinate value.

The obtaining of said intermediate value may comprise determining a mean value of the maximum and minimum co-ordinate values for the first region.

The obtaining of said intermediate value may comprise testing whether the maximum co-ordinate value of the first region is greater than the minimum co-ordinate value of the second region and determining a mean value of the maximum co-ordinate value for the first region and the minimum co-ordinate value of the second region.

The obtaining of said intermediate value may comprise testing whether the maximum co-ordinate value of the first region is greater than the minimum co-ordinate value of the second region, testing whether the maximum co-ordinate value for the first region is greater than the maximum co-ordinate value for the second region and determining a mean value of the maximum and minimum co-ordinate values for the second region.

According to the present invention there is further provided a method, in a display generating device configured to provide a graphical display in which a focus can be navigated between spaced, functional display regions such that they are individually selected when the focus is moved thereto, for operating said display device, the method comprising configuring a plurality of spaced nodes so that the focus makes a step movement from one node to another thereof in response to user actuation, said configuring comprising arranging the nodes in a mesh at the intersections of a first set of spaced lines extending a first predetermined direction and a second set of spaced lines extending in a predetermined second transverse direction, the functional regions being irregularly disposed in the display and one of the nodes being disposed at each of the regions respectively.

According to the present invention there is still further provided a computer program product comprising a computer readable medium having thereon: a computer program configured to provide when loaded on a computer, signals to generate a graphical display in which a focus can be navigated between spaced, functional display regions such that they are individually selected when the focus is moved thereto, to make said computer execute procedure to configure a plurality of spaced nodes so that the focus makes a step movement from one node to another thereof in response to user actuation, the nodes being arranged in a mesh at the intersections of a first set of spaced lines extending a first predetermined direction and a second set of spaced lines extending in a predetermined second transverse direction, the functional regions being irregularly disposed in the display and at least one of the nodes being disposed at each of the regions respectively.

According to the present invention there is still further provided a computer program comprising: computer code to make a computer generate signals for a graphical display in which a focus can be navigated between spaced, functional display regions such that they are individually selected when the focus is moved thereto execute procedure to configure a plurality of spaced nodes so that the focus makes a step movement from one node to another thereof in response to user actuation, the nodes being arranged in a mesh at the intersections of a first set of spaced lines extending a first predetermined direction and a second set of spaced lines extending in a predetermined second transverse direction, the functional regions being irregularly disposed in the display and at least one of the nodes being disposed at each of the regions respectively.

The computer program may be embodied on a computer readable medium.

The computer program may have been down-loaded from a server and stored in storage means.

According to the present invention there is still yet further provided a method of navigating a focus between irregularly spaced, functional display regions on a display device, the method comprising supplying a individual directional input, moving the focus from a first node to a second node in a predefined discrete step along a direction corresponding to said directional input, the second node being disposed between the irregularly spaced, functional display regions, supplying another directional input and moving the focus to a third node disposed within one of said irregularly spaced, functional display regions so as to enable selection of said region.

The method may further comprise arranging the nodes at the intersections of a first set of spaced lines extending a first predetermined direction and a second set of spaced lines extending in a predetermined second transverse direction.

The method may further comprise determining whether a node is disposed within one of said irregularly spaced, functional display regions and is also located within a predefined segment and in the absence of such a node, providing the second node at the predefined discrete step along a direction corresponding to said directional input and moving the focus to said second node.

The first node maybe within one of the irregularly spaced functional display regions, or the first node may not be in one of said regions, in which case the focus may have previously been caused to make a step movement to the first node in response to an individual directional input.

According to the present invention, there is also provided a method of operating a display generating device configured to provide a graphical display in which a focus can be navigated between spaced, functional display regions, said method comprising: receiving an individual directional input; moving the focus from a first node to a second node in a predefined discrete step along a direction corresponding to said directional input, the second node being disposed between the irregularly spaced, functional display regions; receiving another directional input and moving the focus to a third node disposed within one of said irregularly spaced, functional display regions so as to enable selection of said region.

According to the present invention there is also provided a display generating device configured to generate signals for a graphical display in which a focus can be navigated between irregularly spaced, functional display regions on a display device, comprising a first input for supplying an individual directional input, a first controller for moving the focus from a first node to a second node in a predefined discrete step along a direction corresponding to said directional input, the second node being disposed between the irregularly spaced, functional display regions, a second input for supplying another directional input and a second controller for moving the focus to a third node disposed within one of said irregularly spaced, functional display regions so as to enable selection of said region.

The first and second controllers may be unitary.

The first input for supplying the individual directional input may be a user operable navigation control.

The second input for supplying another directional input and the user operable navigation control may be unitary.

According to the present invention there is also provided a computer program comprising: computer code to make data processing apparatus provide signals for a graphical display in which a focus can be navigated between spaced, functional display regions such that they are individually selected when the focus is moved thereto execute procedure to receive an individual directional input, to move the focus from a first node to a second node in a predefined discrete step along a direction corresponding to said directional input, the second node being disposed between the irregularly spaced, functional display regions, to receive another directional input and to move the focus to a third node disposed within one of said irregularly spaced, functional display regions so as to enable selection of said region.

BRIEF DESCRIPTION OF THE DRAWINGS

Embodiments of the present invention will now be described, by way of example, with reference to the accompanying drawings in which:—

FIG. 8a shows a web page as displayed to a user, with a plurality of links;

FIG. 8b illustrates a mesh applied to the web page of FIG. 8a

FIG. 8c illustrates the nodes defined by the mesh shown in FIG. 8b;

BEST MODE FOR CARRYING OUT THE INVENTION

Figure 1:
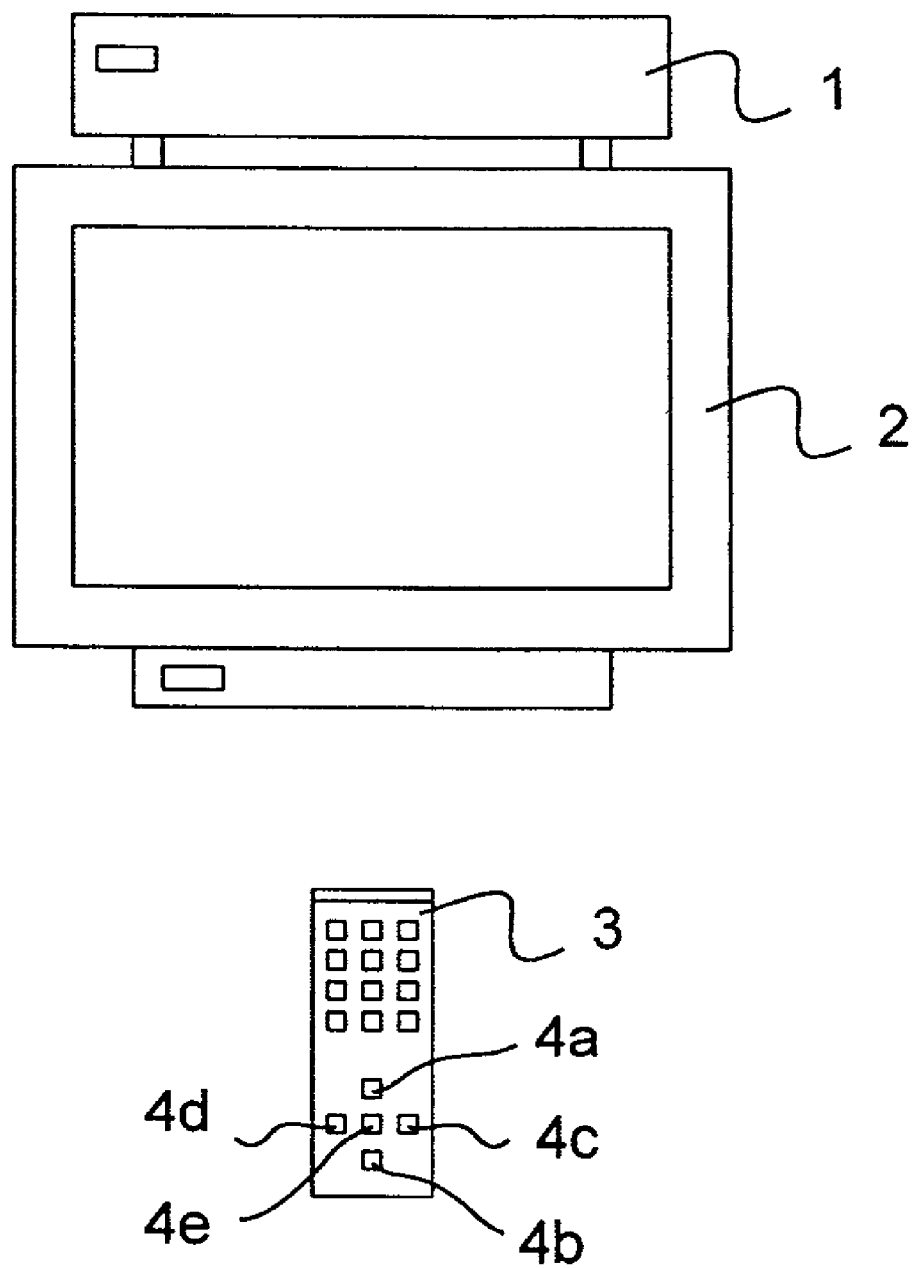
FIG. 1 is a schematic view of a prior art set-top box and a television.

Referring to FIG. 1, a prior art digital set-top box 1 is connected to a television set 2. The set-top box 1 is controlled using a remote control unit 3 having up, down, right and left keys 4a, 4b, 4c, 4d and a select button 4e.

The set-top box 1 may be used to receive and decode digital television channels and transmit user information along a return channel. These channels are carried on signals that are transmitted and received through cable, satellite or terrestrial broadcast links.

The set-top box 1 provides Internet services to the user, thus enabling the user to read e-mail and "surf the web". To access the web, the set-top box 1 loads and runs web browser software such as Microsoft™ Internet Explorer software.

Figure 2:
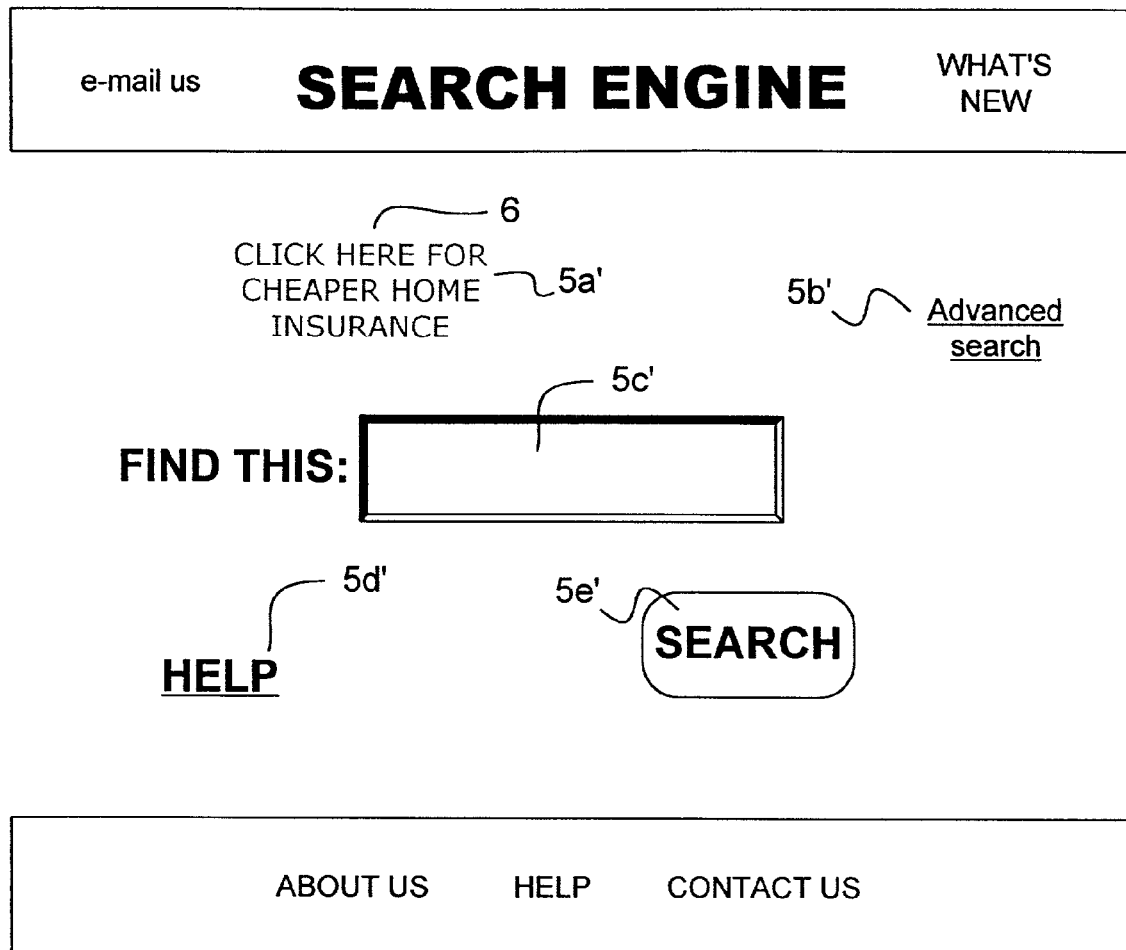
FIG. 2 shows a web page having several hypertext links.

A typical web page, showing the front-end of a search engine, is illustrated in FIG. 2. The web page comprises text and images and includes first, second, third, fourth and fifth hypertext links 5a', 5b', 5c', 5d', 5e'.

In this example, the first hypertext link 5a' is an advertisement and a link to a web page of an insurance company. A focus 6 is set at the first link 5a' and is highlighted by a change in colour of the text, in this example, to the colour grey. To select the link 5a', the select key 4e is pressed. The second hypertext link 5b' is a link to another page of the search engine. To move the focus 6 from the first link 5a' to second link 5b', the user presses the right arrow key 4c on the remote control unit 3.

This method of movement and selection of a link on a page accessed using a set-top box 1 is compared with that accessed using a PC.

In a PC-based system a mouse pointer represents the focus and is moved by dragging a mouse across a surface. The mouse pointer is positioned over the hypertext link, which may result in either the link or the pointer changing in appearance. The user selects the link by pressing the mouse button or a key on the keyboard. In the PC-based system, using a mouse to select links is fast and accurate. However, the use of a mouse with a set-top box is not practical, because the user is normally sat away from the television set.

Figure 3:
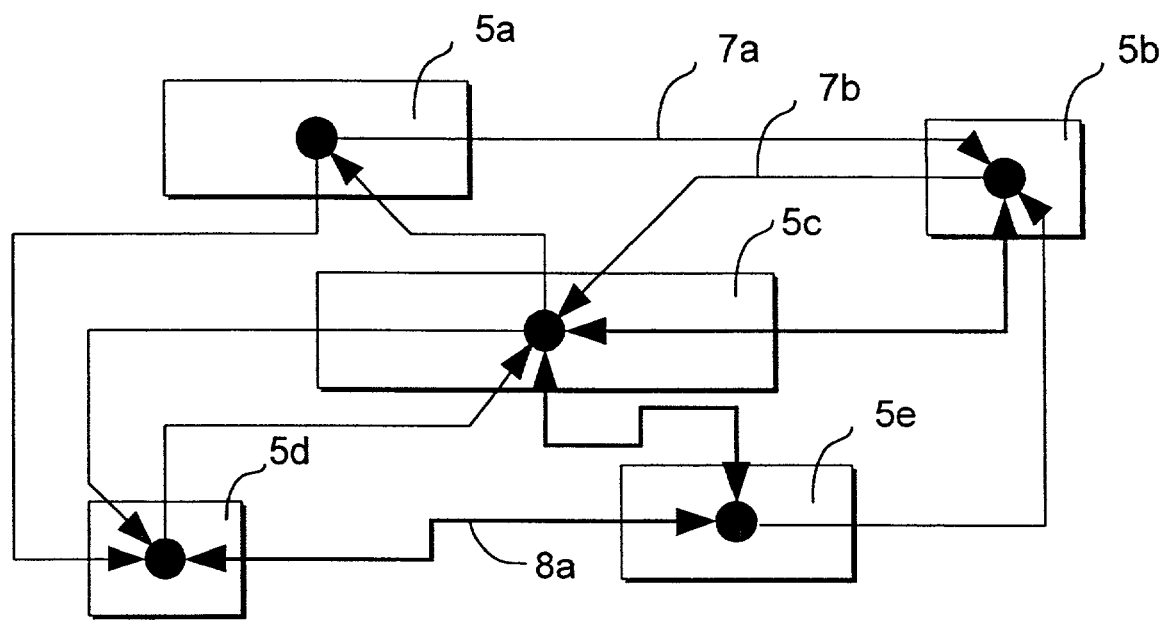
FIG. 3 shows navigation from link to another using a set of keys.

Referring to FIG. 3, the hypertext links 5a', 5b', 5c', 5d', 5e' are associated with functional display regions comprising logical regions 5a, 5b, 5c, 5d, 5e. In the PC-based system, positioning on the mouse pointer anywhere within a logical region 5a, 5b, 5c, 5d, 5e and pressing the mouse button would result in selection of a link associated with that logical region. In the set-top box system, pressing the arrow keys 4a, 4b, 4c, 4d moves the focus from one whole logical region 5a, 5b, 5c, 5d, 5e to another.

FIG. 3 shows valid paths by which the focus may pass between regions 5a, 5b, 5c, 5d, 5e using the arrow keys 4a, 4b, 4c, 4d.

Some valid paths are one-way only. For example, starting with the focus at the first region 5a in the top right-hand corner, pressing the right arrow key 4c moves the focus to the second region 5b in the top right-hand corner as shown by a first transition 7a. However, pressing the left arrow key 4d results in the focus moving to the third region 5c in the centre as shown by a second transition 7b.

Compare this with bi-directional paths, along which the focus may pass reversibly. For example, starting with the focus at the fourth region 5d in the bottom left-hand corner, pressing the right arrow key 4c moves the focus to the fifth region 5e in the bottom right-hand corner. Pressing the left arrow key 4d results in the focus passing back to the fourth region 5d. This is a reversible path 8a.

Thus, it is apparent that using the remote control unit 3 movement between the regions is not intuitive and may not be reversible.

The present invention seeks to solve this problem.

PREFERRED EMBODIMENTS OF THE INVENTION

Set-Top Box

Figure 4:
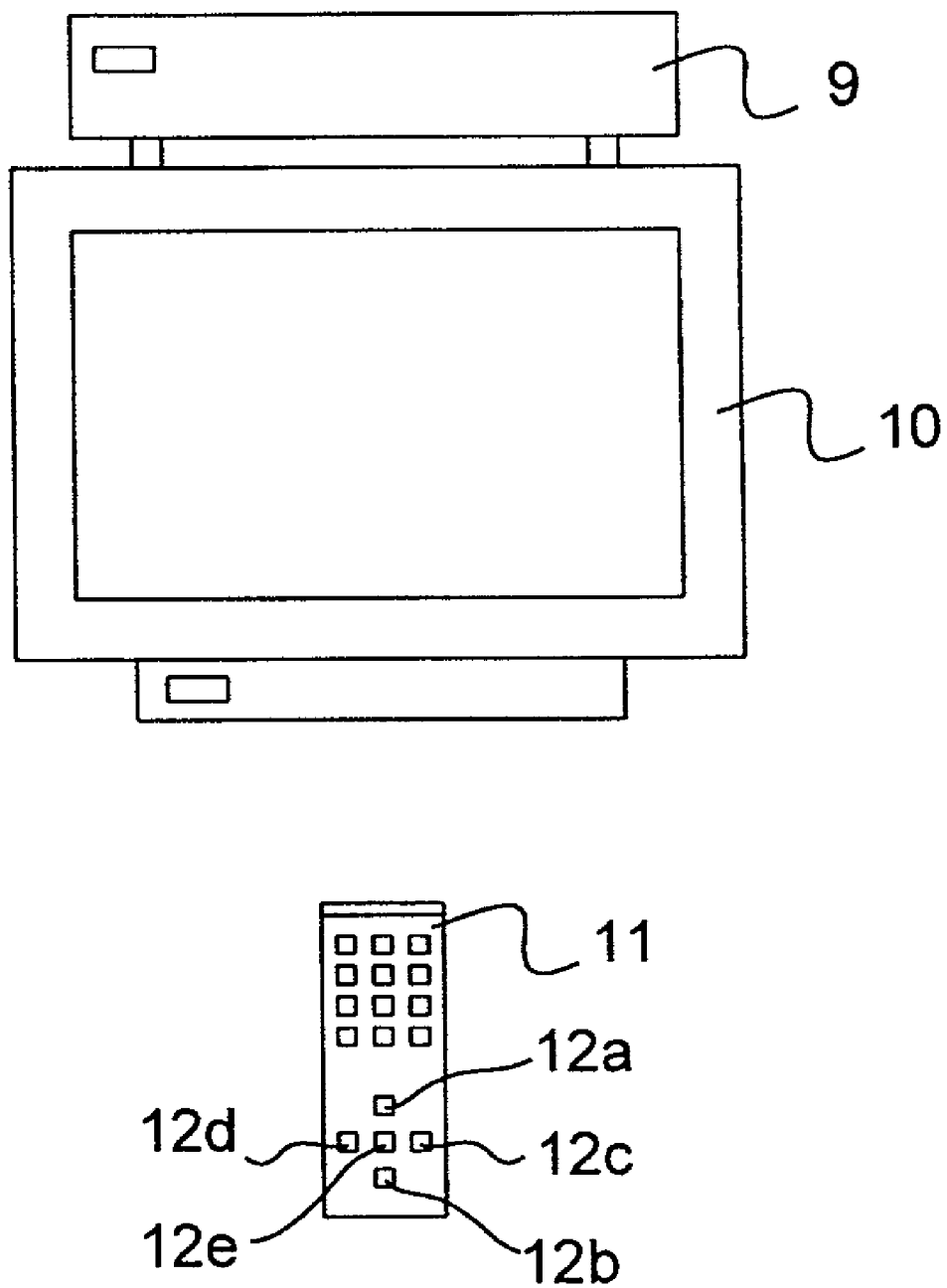
FIG. 4 is a schematic view of a set-top box and a television in accordance with a first embodiment of the invention.

Referring to FIG. 4, a first embodiment of display generating device according to the present invention is a digital set-top box 9 which is connected to a display device in the form of a conventional television set 10. The set-top box 9 is controlled using a remote control unit 11 having up, down, right and left keys 12a, 12b, 12c, 12d and a select button 12e. In this case, up, down, right and left directions correspond to movement as seen on the television set 10.

The set-top box 9 comprises one or several input ports (not shown) including a port for a satellite antenna dish, a port for a terrestrial antenna, a port for a cable link and a port for a broadband internet connection and an output port (not shown) for connection to the television set. The set-top box 9 further comprises a microprocessor, memory, front-end tuner for filtering the signal, a video chip for rendering an image on the television set 10 and a user interface (not shown).

The set-top box 9 may be used to receive and decode digital television channels and transmit user information along a return channel. These channels are transmitted and received through a cable link, although links provided by satellite or terrestrial broadcast may also be used.

An overview of high-speed data links suitable for carrying digital TV signals is given in a collection of articles in Scientific American, October 1999, pp. 73–95.

The set-top box 9 provides Internet services to the user, thus enabling the user to read e-mail and "surf the web". To access the web, the set-top box 9 loads and runs web browser software such as Microsoft™ Internet Explorer software that has been modified. The modification will be described in detail later.

Figure 5:
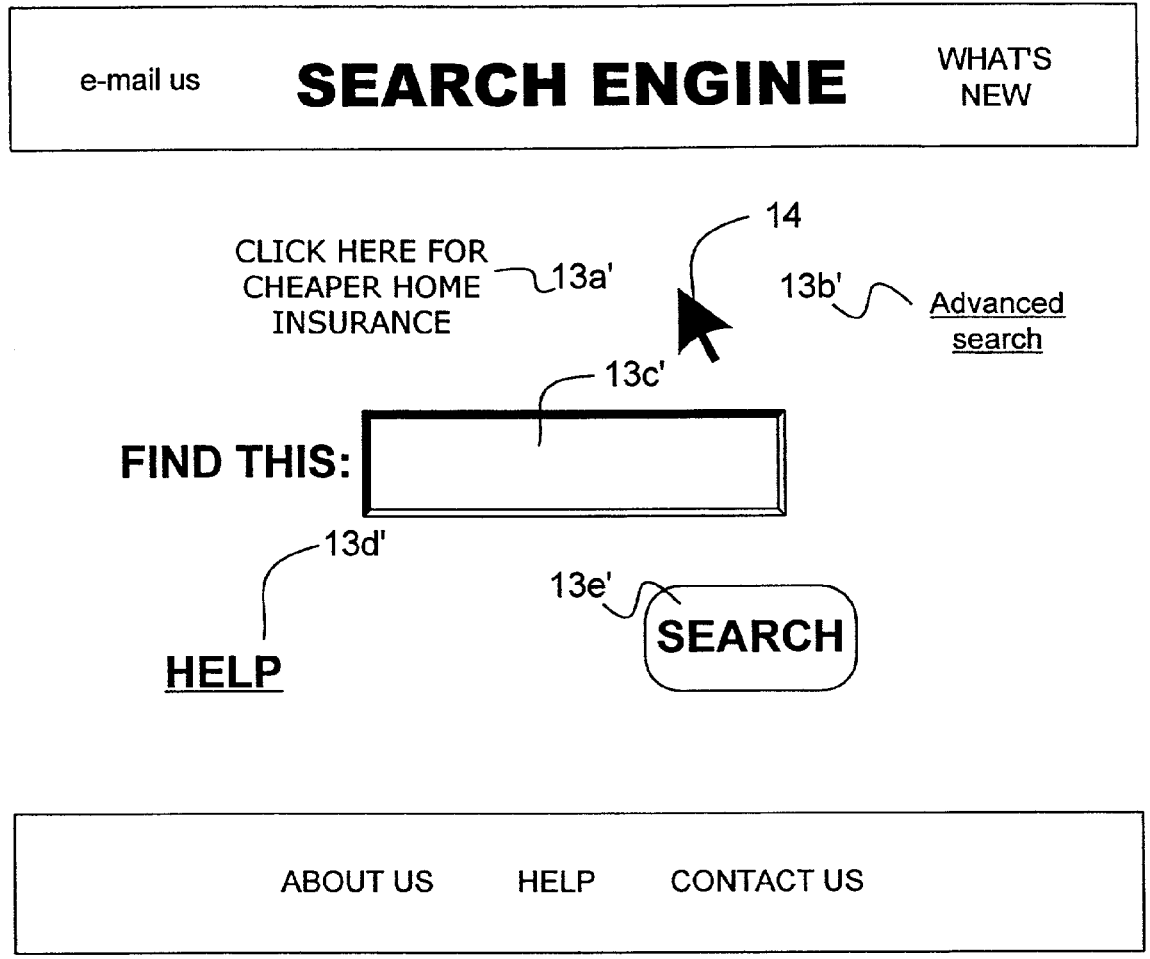
FIG. 5 shows a web page having several hypertext links.

A typical web page, showing the front-end of a search engine, is illustrated in FIG. 5. The web page comprises text and images and includes first, second, third, fourth and fifth hypertext links 13a', 13b', 13c', 13d', 13e'.

In this example, the first hypertext link 13a' is an advertisement and a link to a web page of an insurance company. The second hypertext link 13b' is a link to another page of the search engine. A focus 14 is set between the first and second links 13a', 13b' and is represented as a pointer. To move the focus 14 to second link 13b', the user presses the right arrow key 12c on the remote control unit 11.

Figure 6:
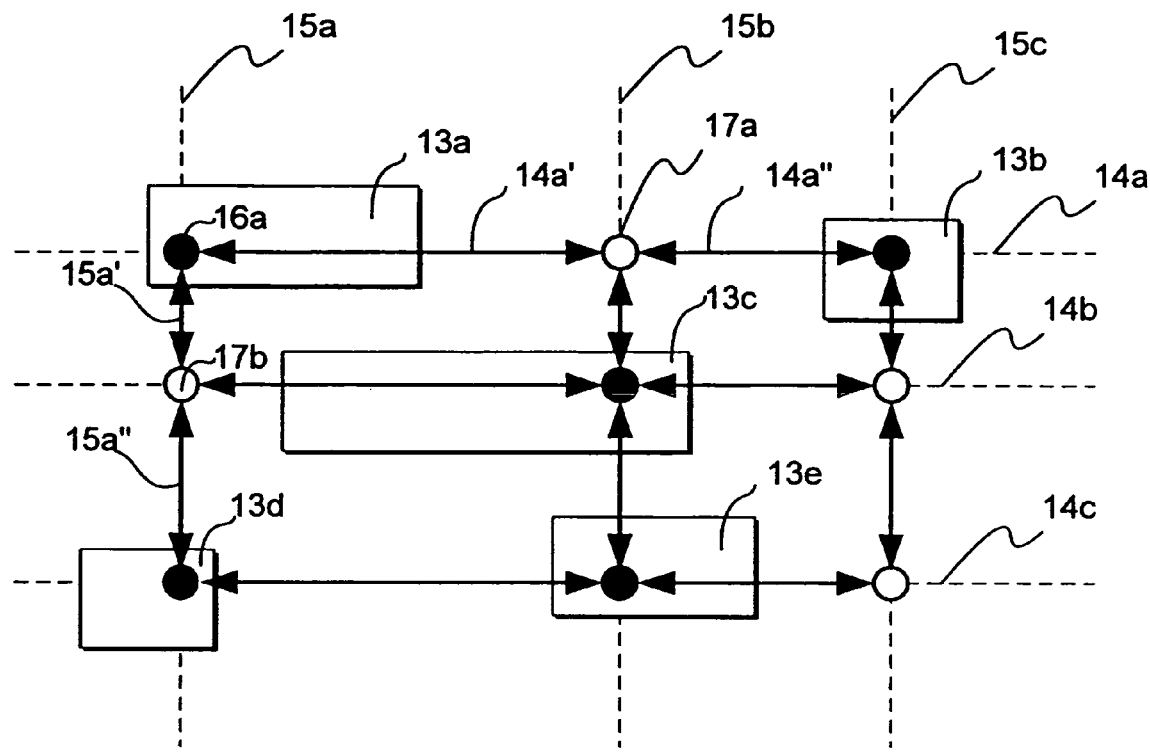
FIG. 6 shows navigation from region to another using a set of keys in accordance with the present invention.
Figure 7:
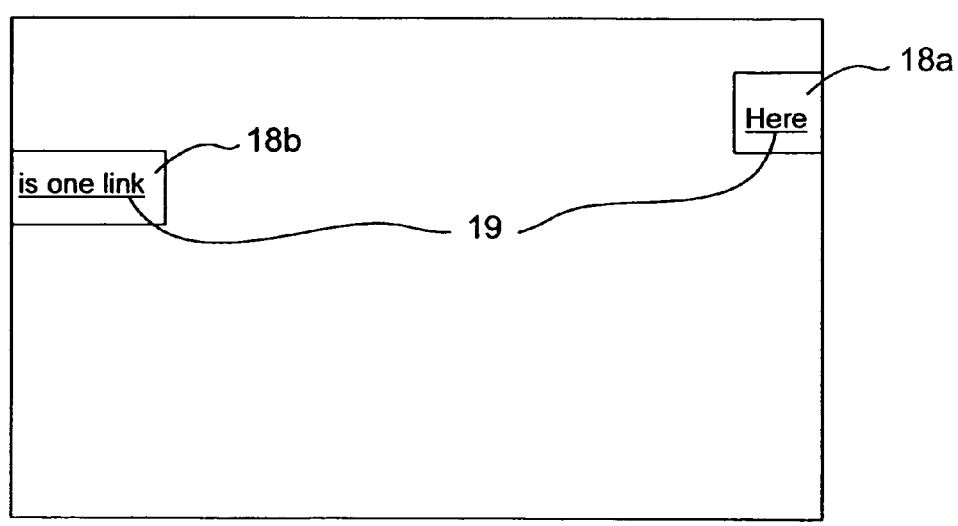
FIG. 7 shows two regions associated with one hypertext link.

Referring to FIGS. 6 and 7, the hypertext links 13a', 13b', 13c', 13d', 13e' are associated with functional display regions comprising irregularly disposed logical regions 13a, 13b, 13c, 13d, 13e. These logical regions 13a, 13b, 13c, 13d, 13e are created by the web-browser. The regions 13a, 13b, 13c, 13d, 13e are based on the encapsulated area of the link 13a', 13b', 13c', 13d', 13e', as defined by, for instance, the boundaries of an image or of a single text line. The regions 13a, 13b, 13c, 13d, 13e are expanded by $1/50^{th}$ of the visible display in each direction. It will be appreciated that the regions 13a, 13b, 13c, 13d, 13e may be shrunk or not expanded at all. Furthermore, the boarders of the regions 13a, 13b, 13c, 13d, 13e may be expanded independently of one another. Also, the regions 13a, 13b, 13c, 13d, 13e may be expanded by a relative factor. For example the height of the region may be expanded by 1.5 times. The regions do not overlap and do not have to have a direct connection to the graphical representation. Several regions may be connected to the same link. For example, two regions 18a, 18b may be required to represent the same link 19 when a sentence wraps into a new line, as shown in FIG. 7.

The web-browser also executes an algorithm, which generates a mesh of horizontal and vertical lines 14, 15 and places nodes 16, 17 at the intersection of these mesh lines 14, 15. The lines 14, 15 of the mesh are not actually displayed to the user, but define permitted paths of travel for the focus.

Referring to FIG. 6 once more, the nodes 16, 17 provide a closed set of allowable positions for the focus. The mesh lines 14, 15 are arranged according to a co-ordinate system that is mapped by the arrow keys 12a, 12b, 12c, 12d. The remote control unit 11 provides user actuation to move the focus from one the nodes 16, 17 to a next another one thereof in the mesh in any of the directions of the arrow keys 12a, 12b, 12c, 12d as seen on the television set 10. Thus, all nodes 16, 17 on the mesh are accessible in a consistent manner using arrow keys 12a, 12b, 12c, 12d of the remote control unit 11.

The first set of spaced mesh lines 14 extend in a first predetermined direction and a second set of spaced mesh lines 15 extend in a second transverse direction. In this case, members of the first set of mesh lines 14 extend horizontally and are spaced vertically from one another with differing degrees of separation. For example, the first and second mesh lines 14a, 14b of the first set 14 are more closely spaced than the second and third mesh lines 14b, 14c of the same set 14. Members of the second set of mesh lines 15 extend vertically and are non-equally spaced from one another along the horizontal.

Thus in use, each individual depression of the up, down, left or right keys 12a–d on the remote control unit produces a corresponding individual up, down, left or right step movement of the focus 14 from node to node (16 or 17) in the mesh shown in FIG. 6, thus facilitating an easy and predicable movement of the focus on the screen in response to the key operation.

Whilst in this example, the first and second sets of mesh lines 14, 15 are orthogonal, it will be appreciated that the second set of mesh lines 15 may cross the first set 14 at angles that are non-perpendicular. Furthermore, the mesh lines may be based along radial and polar co-ordinates with corresponding controls being provided on the remote control unit.

The nodes fall into two categories: a first set of nodes 16 indicating focus positions where a region can be selected and a second set of nodes 17 indicating focus positions which serve as a guide to the user.

Each logical region 13a, 13b, 13c, 13d has at least one node 16 located within it. This is more formally described by the condition:

$$\forall \gamma : \exists : \Gamma_{x_\lambda} \leq x_\alpha \leq \Gamma_{\bar{x}_\gamma} \hat{} \Gamma_{y_\lambda} \leq y_\beta \leq \Gamma_{\bar{y}_\gamma}$$

where a node 16, 17 on the mesh is defined by its co-ordinate $(x_\alpha, y_\beta)$ such that $$\alpha \in [1, N_\alpha]$$

and $$\beta \in [1, N_\beta]$$

where $N_\alpha$, $N_\beta$ are index ranges, and where a rectangle is defined as having minimum and maximum values in x and y co-ordinates, namely:

$$\Gamma_{x_y}, \Gamma_{\bar{x}_y}, \Gamma_{x_p}, \Gamma_{\bar{y}_y}$$

Referring to also to FIG. 5, an example of how the user may move the focus from the second region 13b to the fourth region 13d will now be described.

The user sees the second hypertext link 13b' highlighted in grey, with the other hypertext links 13a', 13c', 13d', 13e' coloured black. The user presses the left key 12d on the remote control unit 11. The result of this is that the second hypertext link 13b' returns to a black colour and a pointer icon 14 appears at a position corresponding to a first member 17a of second set of nodes 17. The user presses the left key 12d once more and the pointer icon 14 disappears and the first hypertext link 13a' becomes highlighted in grey. The user presses the down key 12b. The result of this is that the first hypertext link 13a' returns to a black colour and a pointer icon 14 appears at a position corresponding to a second member 17b of second set of nodes 17. Finally, the user presses the down key 12b once more.

The pointer icon 14 disappears and the fourth hypertext link 13d' becomes highlighted in grey. The user may select the fourth hypertext link 13d' by pressing the select key 12e on the remote control unit 11. It will be appreciated that the user may navigate between these two links along several paths, back-tracking along the same path if the user so wishes. It will be appreciated that the focus may move between any link 13 or guide node 17 in a similar fashion. It will be appreciated that the links may have different colours. Furthermore, rather than highlighting the text, a region coextensive with the logical region may be highlighted by colour. Highlighting may also be effected by blinking cursors. It will also be appreciated that the pointer icon 14 need not be shaped as an arrow. It may be shaped as a circle, a representation of a hand or a set of cross-wires.

Figure 8:
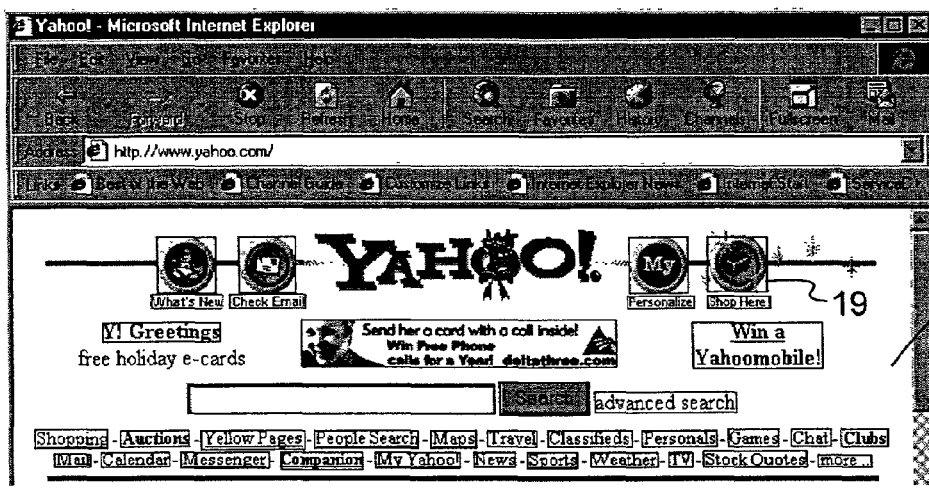
Figure 8:
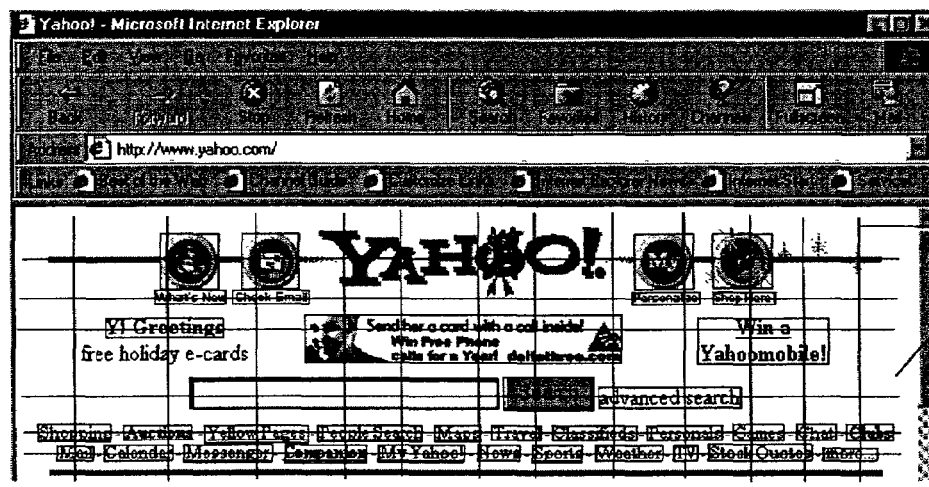
Figure 8:
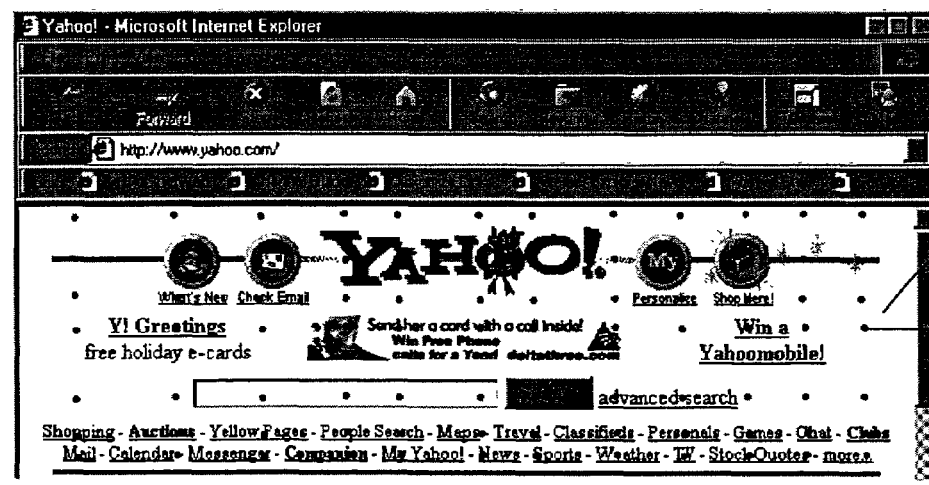

Referring to FIGS. 8a,b,c, a web page 18 comprises a plurality of links having logical regions 19 associated with them. A non-visible mesh 20 is generated in a manner as will be described in detail below. At intersections of the mesh lines, a plurality of nodes 21 are disposed. Some regions 19 have more than one node located within it.

Mesh Generation

Figure 9:
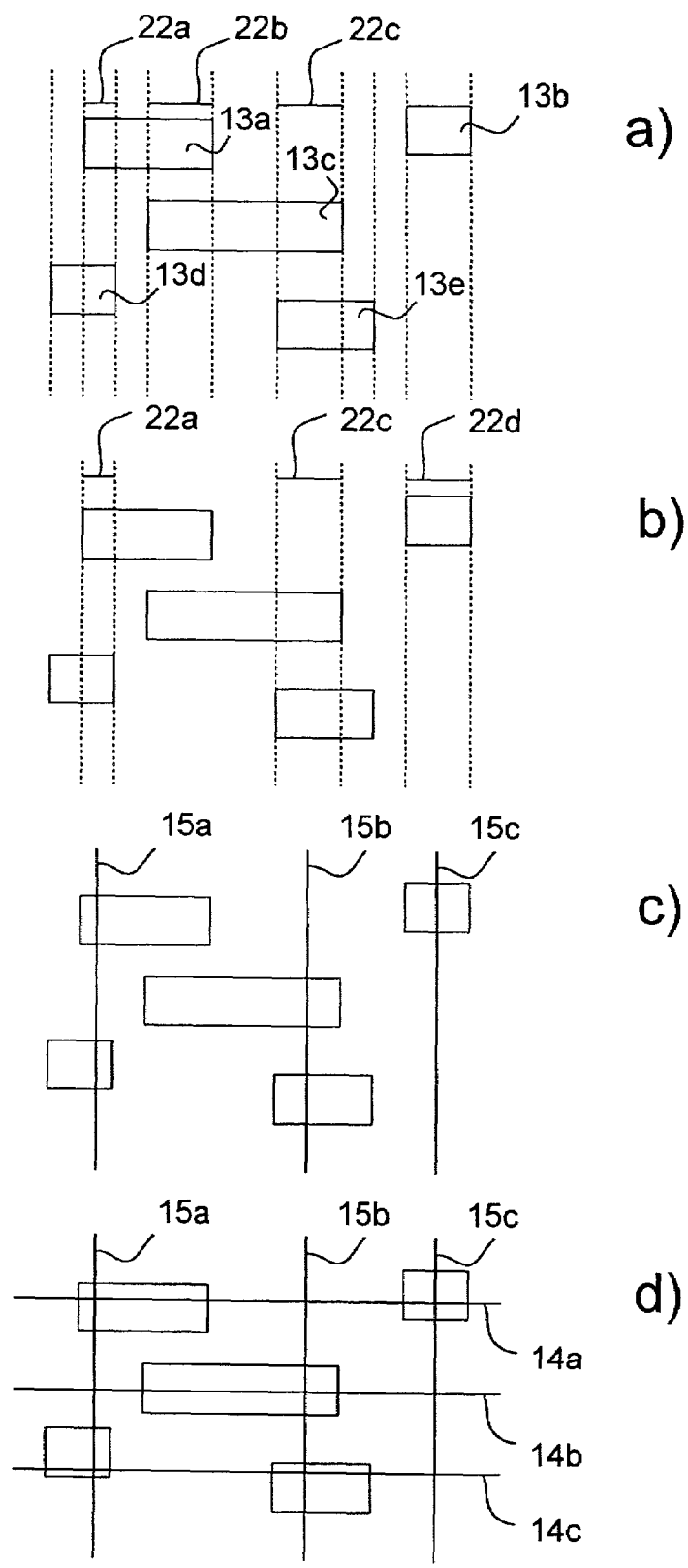
FIG. 9 diagrammatic shows how a mesh is generated for locating the nodes.

A method by which the mesh is generated will now be described. Referring to FIG. 9a, the first, second, third, fourth and fifth logical regions 13a, 13b, 13c, 13d, 13e are illustrated, indicting that these regions overlap along x-axis. Overlaps are indicated by first, second and third overlap bars 22a, 22b, 22c.

Referring to FIG. 9b, a condition is imposed that a rectangle is deemed to participate in only one overlap. Starting from the left and moving right, first and fourth regions 13a, 13d participate in an overlap. The third region 13c is excluded from being considered as participating in an overlap. Moving further to the right the next regions to participate in an overlap are the third and fifth regions 13c, 13e. Moving to the right further still the second region 13b does not overlap with any other regions. Therefore, the second region 13b is deemed to overlap with itself and is represented by a fourth overlap bar 22d.

Referring to FIG. 9c, the midpoints of the remaining overlap bars 22a, 22c, 22d serve as the x-co-ordinate of the horizontal lines 15a, 15b, 15c of the mesh.

The process is repeated in the y-direction and the result is shown in FIG. 9d.

The method of determining the position of lines along the x-axis is performed by a web-browser software plug-in, using a algorithm, which will now be described.

Figure 10:
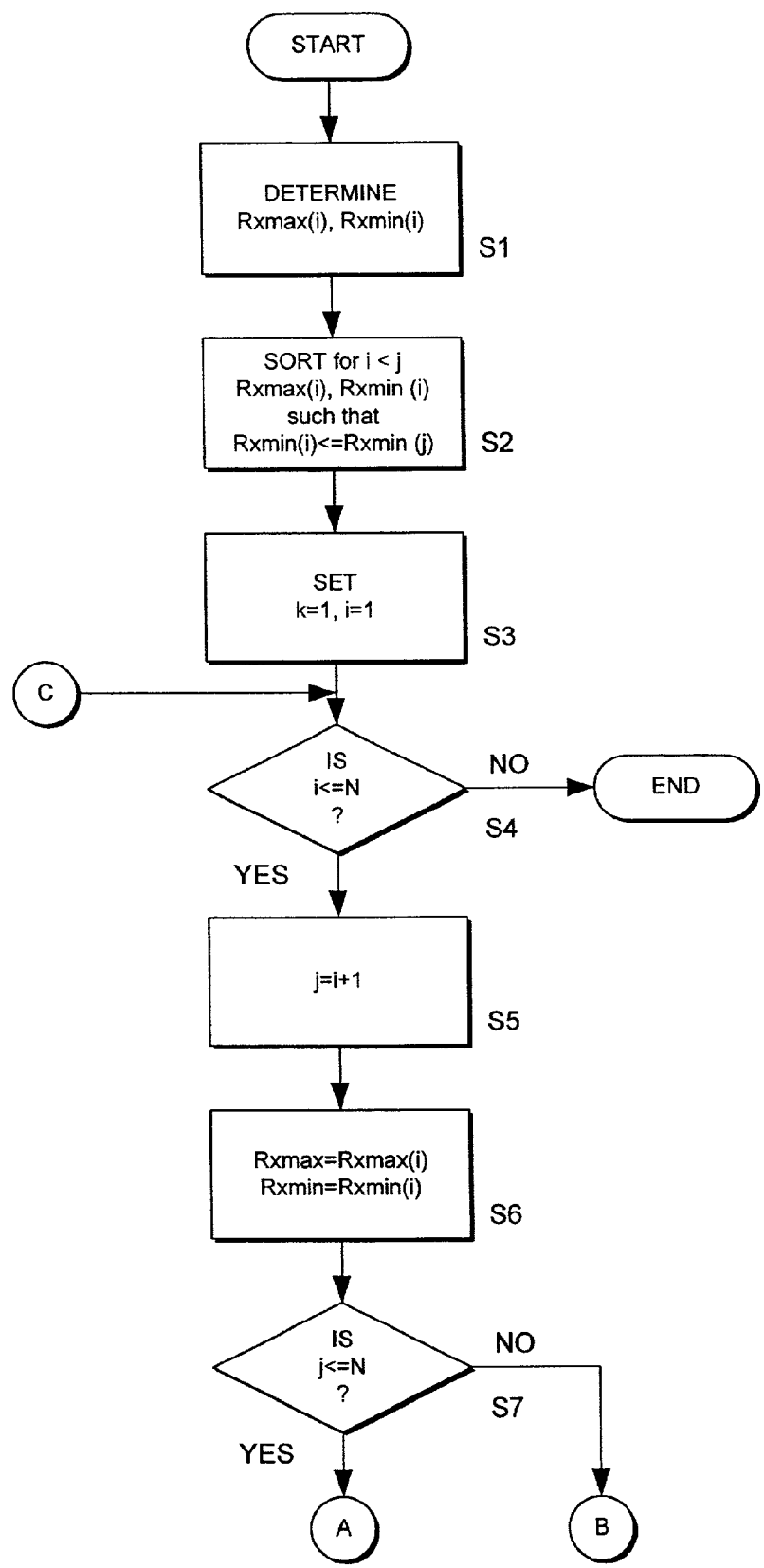
FIG. 10 is a process flow diagram by which the mesh is generated.

Referring to FIG. 10, the algorithm determines the minimum and maximum x co-ordinate values for N rectangles (Step S1) and sorts them in order of increasing value of the co-ordinate of the left-hand edge of each rectangle (Step S2). A present rectangle counter, i, and an x-axis mesh line counter, j, are set to unity (Step S3).

The algorithm checks whether there are any more rectangles to be worked on (Step S4). If there are, the algorithm continues by setting the next rectangle counter, j, to the present rectangle pointer plus one (Step S5), otherwise the algorithm terminates. The algorithm sets floating values of minimum and maximum x to the values of minimum and maximum co-ordinate values of the present rectangle (Step S6). The program checks whether there is another rectangle to the right of the present one (Step S7). If there is, the algorithm checks whether the present rectangle overlaps with the next rectangle (Step S8). If it does, the algorithm sets the floating minimum x value to the minimum co-ordinate value of the next rectangle (Step S9). The algorithm checks whether the present rectangle eclipses the next rectangle (Step S10). If it does, the algorithm sets the floating maximum x value to the maximum co-ordinate value of the next rectangle (Step S11).

The algorithm increments the present rectangle counter, i, by one (Step S12).

If any of the tests in Steps S7, S8 or S9 is negative then the process skips directly to Step S12.

At this point the algorithm holds in the floating values of minimum and maximum values of x the limits of the overlap between the present and next rectangles. If there is no next rectangle as determined in Step S7 or if there is no overlap as determined in Step S8, then the floating values represent the minimum and maximum co-ordinate values of the present rectangle.

The algorithm then determines the x-co-ordinate of the $k^{th}$ mesh line passing through the present and next rectangle (Step S13). The k counter is incremented by one (Step S14) and the algorithm returns to Step S4.

Reduction of the Number of Mesh Lines by Expanding Regions

The number of mesh lines may be reduced if two or more rectangles nearly, but not quite, overlap.

Figure 11:
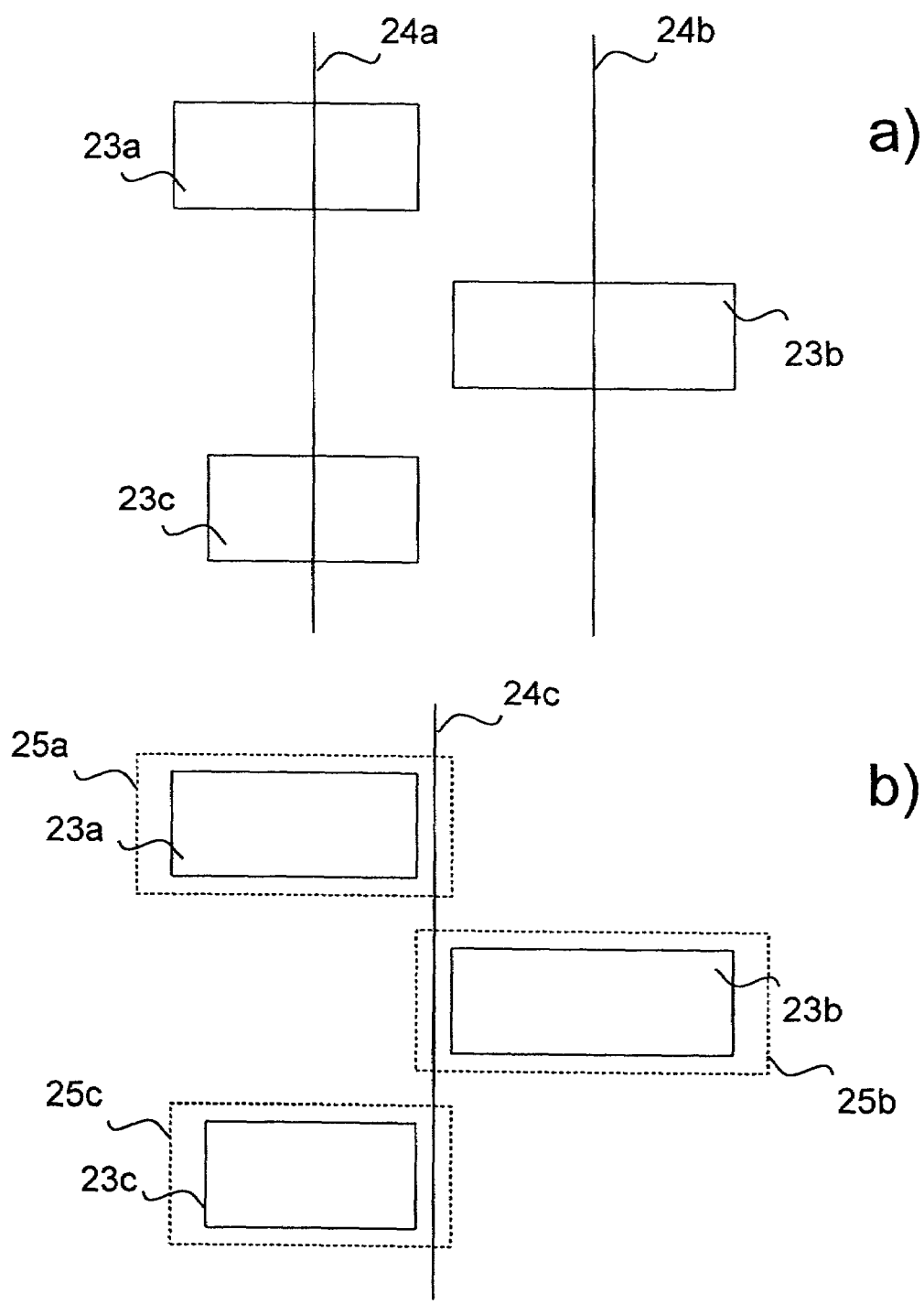
FIG. 11 illustrates how a selectable region may be expanded to facilitate generation of the mesh.

Referring to FIG. 11a, three non-overlapping regions 23a, 23b, 23c are illustrated. Ordinarily, two mesh lines 24a, 24b would be required. However, by logically expanding the regions to give three expanded regions 25a, 25b, 25c, it is possible that just one mesh line 24c is needed to pass through all three regions as shown in FIG. 11b.

The algorithm by which regions may be logically expanded, without overlapping will now be described.

Figure 12:
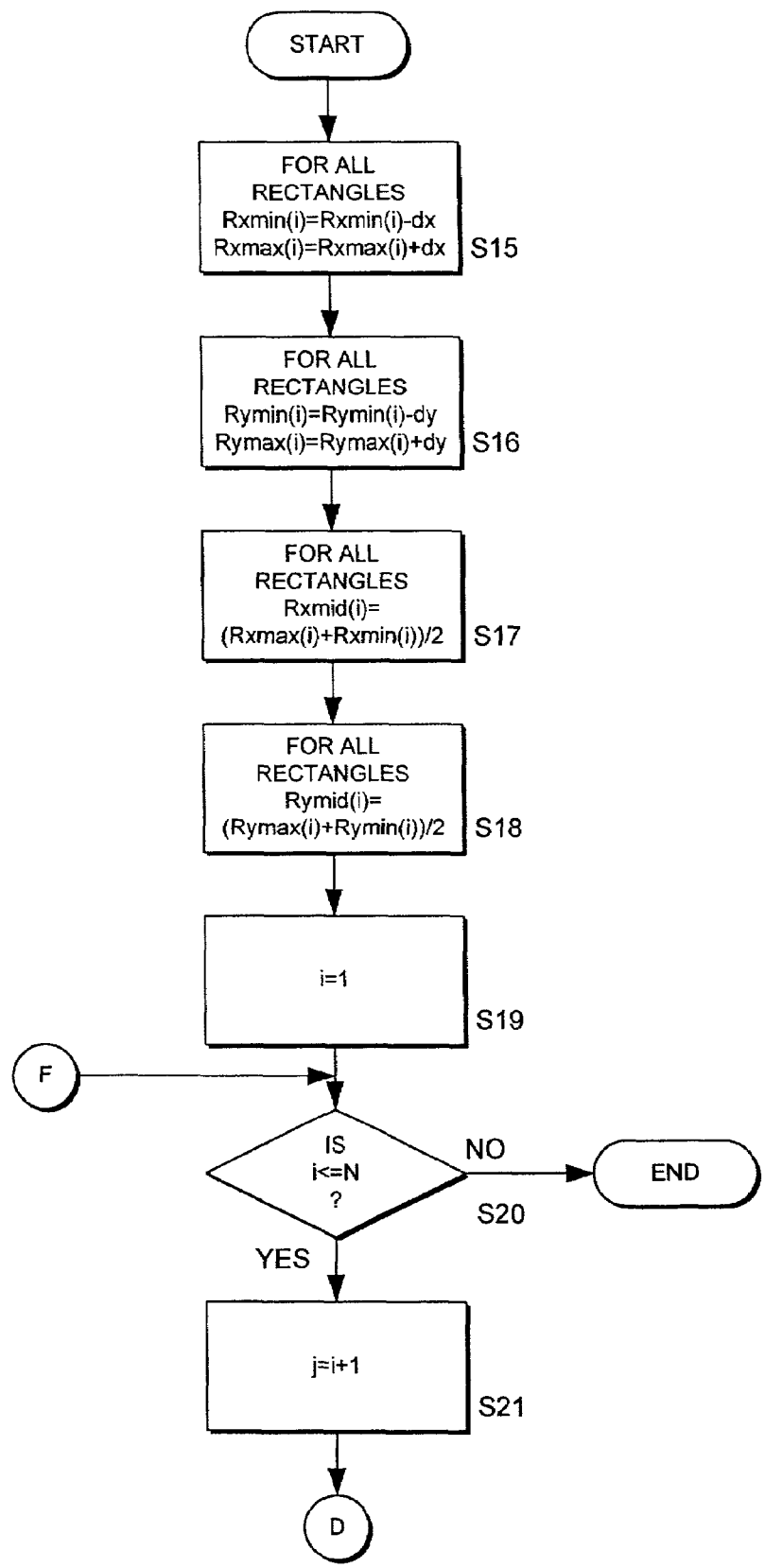
FIG. 12 is a process flow diagram by which regions may be logically expanded.

Referring to FIG. 12, the algorithm expands every rectangle by 2dx in the x direction (Step S15) and by 2dy in the y-direction (Step S16). The algorithm then determines the mid-point of the rectangle in the x-direction (Step S17) and in the y-direction (Step S18). A present rectangle counter, i, is set to one (Step S19).

The algorithm checks whether there are any more rectangles to works on (Step S20). If there are not, the algorithm terminates, otherwise it continues by setting a next rectangle counter, j, to the value of the present rectangle counter plus one (Step S21). The algorithm checks whether there is another rectangle to the right of the present one (Step S22). If there is, the algorithm determines whether the two rectangles overlap (Step S23). If they do then the algorithm checks which of the two rectangles has its middle further to the left (Step S24). If it is the present rectangle then the algorithm contracts the rectangle by 2dx in x-direction (Step S25).

If it is the next rectangle then the algorithm shrinks the rectangle by 2dx in x-direction (Step S26).

The algorithm checks which of the two rectangles has its middle furthest up (Step S27). If it is the present rectangle then the algorithm contracts the rectangle by 2dy in y-direction (Step S28). If it is the next rectangle then the algorithm shrinks the rectangle by 2dy in y-direction (Step S29).

Finally, the algorithm increments the present rectangle counter, i, by one (Step S30) and returns to Step S20.

Navigation Around the Mesh

Once the mesh has been generated for a page, co-ordinates for the nodes may be cached. Every time a key is pressed, the web-browser looks up the co-ordinates of the nodes and determines the new focus position.

It is possible to "skip" nodes within the same region, so that the region is exited with one keystroke. This allows for faster control of the focus, although absolute certainty of the destination of the focus may be compromised. Nevertheless, movement of the focus is still intuitive.

Figure 13:
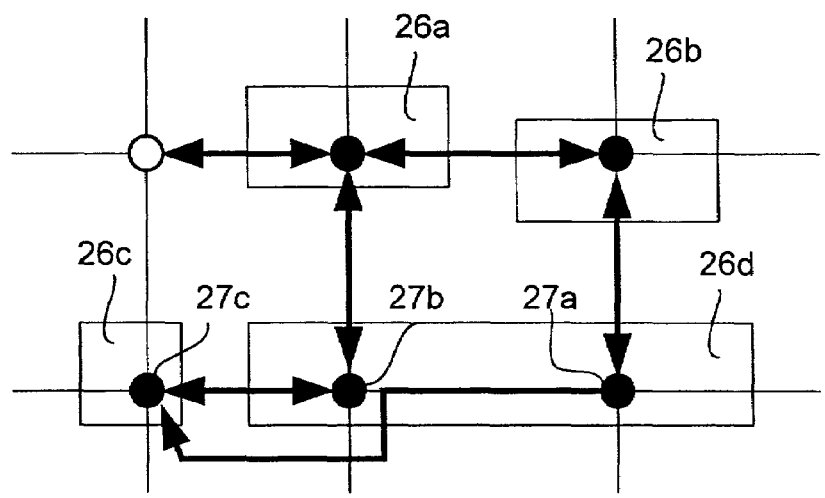
FIG. 13 shows how a focus may skip a node.

Referring to FIG. 13, sixth, seventh, eighth and ninth regions 26a, 26b, 26c, 26d are disposed on a web page. The ninth region 26d holds sixth and seventh nodes 27a, 27b. The focus is set at the sixth node 27a. If the left arrow key 12d is pressed then the seventh node is skipped and the focus move directly to the eighth node 27c, located in the eighth region 26c. Thus, the focus leaves the ninth region 26d with a single keystroke.

Scroll Bar

The remote control unit may be used to navigate the whole web page even if the page is larger than web-browser window, because movement of the focus occurs in a predictable and intuitive way.

Figure 14:
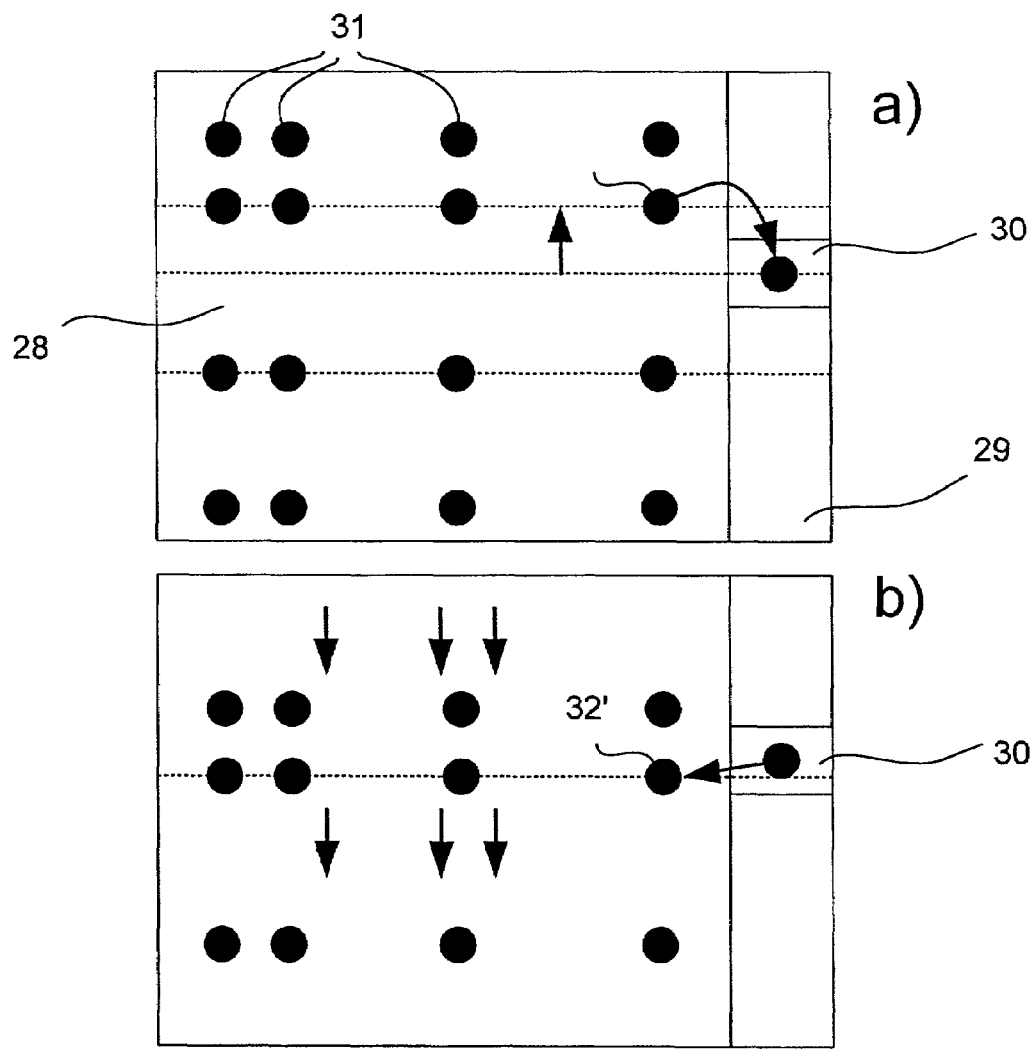
FIG. 14 illustrates transition from a node on a web page onto a node on a scroll bar.

A schematic of a web-browser window is illustrated in FIG. 14, showing a page 28, scroll bar 29 having a scroll bar handle 30 and a set of nodes 31, which have been generated by the browser software. The focus may move from one node to another in a manner previously described. The focus may be transferred to the scroll bar handle 30 by first moving the focus to a node 32 closest to the scroll bar handle 30 and pressing the right key on the controller once more, as shown in FIG. 14a.

Once the focus has moved onto the scroll bar handle, the web page may be scrolled up and down by using the up and down arrow keys on the remote control. To leave the scroll bar handle, the left key is pressed and the focus is transferred to the nearest node, as shown in FIG. 14b.

Multiple Meshes

More than one mesh of different sizes and configuration may be patched together. This allows movement of the focus between different frames, between the web page and a toolbar and between areas of a web page having different densities of links.

Figure 15:
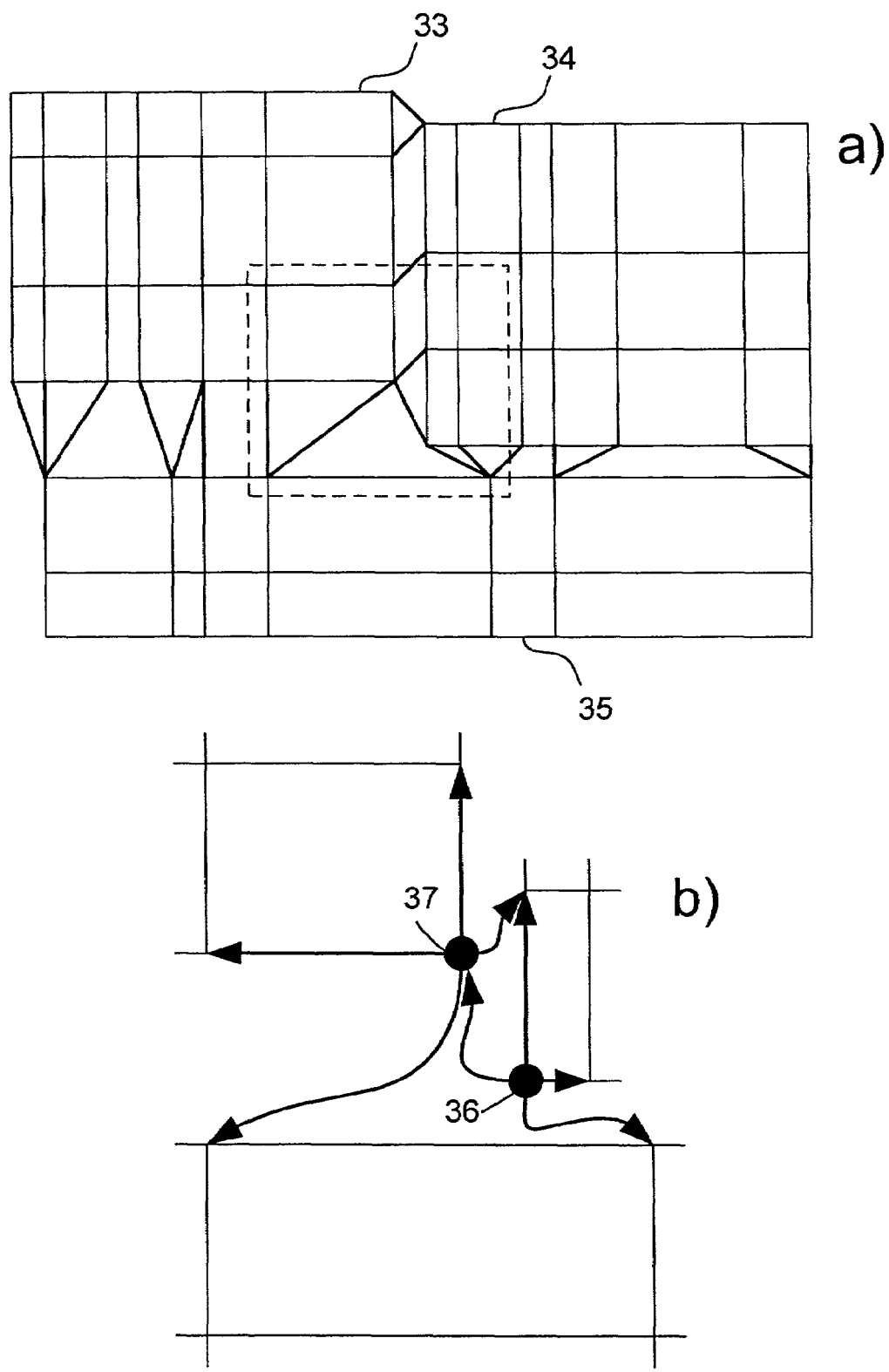
FIG. 15 shows a patchwork of three meshes and illustrates transitions from a node located in one mesh to another.

A patchwork of first, second and third meshes 33, 34, 35 is shown in FIG. 15a. The heavy lines denote transitions between meshes.

Referring to FIG. 15b, which is an enlarged view of the region in the hatched outline of FIG. 15a, in order to cross from one mesh to another, the user moves the focus off the mesh. For example, to move from a first node 36 on the second mesh 34 to a second node 37 on the first mesh 33, the left arrow 12d is pressed on the remote control 11.

Multiple Layer Navigation

Meshes of different detail may be overlaid over the same area of the page. This allows for speedy navigation about the page.

Figure 16:
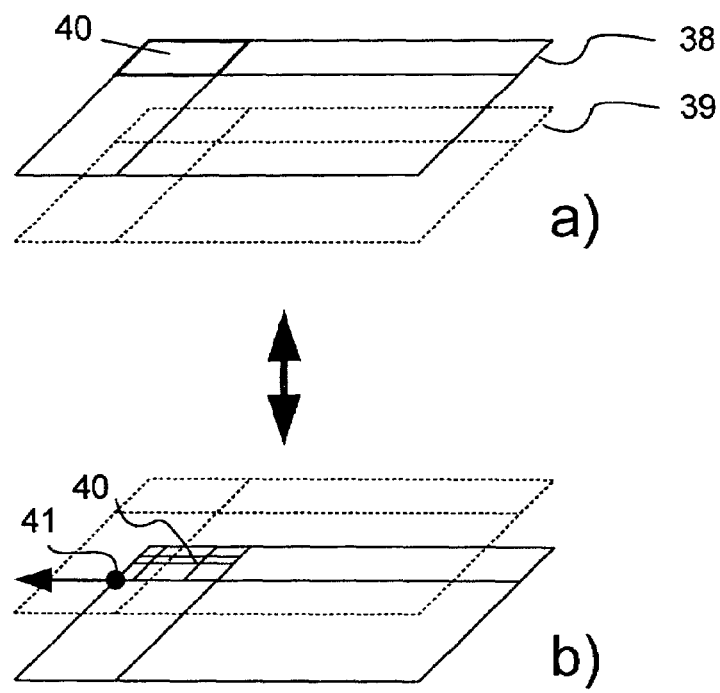
FIG. 16 illustrates two-level navigation.

A two-level mesh system is shown in FIG. 16.

Referring to FIG. 16a, the top-level mesh 38 allows navigation between areas 40, such as windows. A key is pressed to drop to a high-density mesh 39 as shown in FIG. 16b. The high-density mesh allows navigation between links 40 as previously described. To jump to the top level, the user may either attempt to move outside the mesh from a node 41 at the edge or press a key.

Personal Computer

Figure 17:
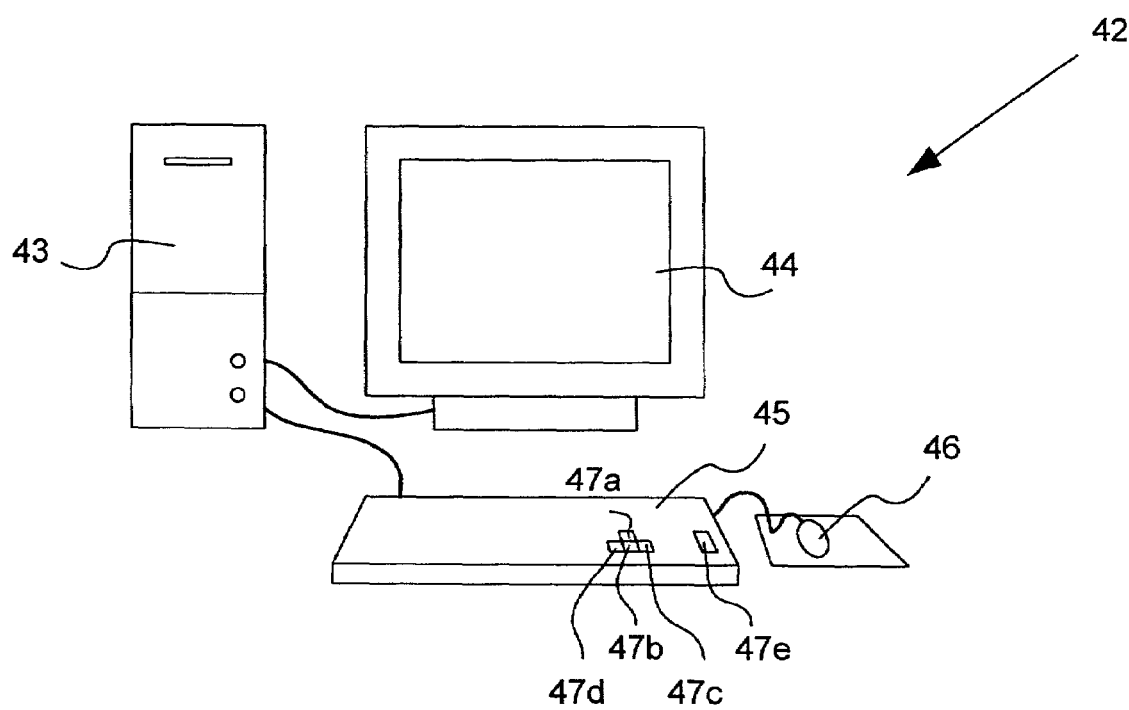
FIG. 17 is a schematic view of a personal computer system.

Referring to FIG. 17, a second embodiment of the present invention is a personal computer (PC) system 42. The PC system comprises a hardware box 43, a monitor display 44, a keyboard 45 and a mouse 46. The keyboard includes up, down, right and left arrow keys 47a, 47b, 47c, 47d and an 'ENTER' key 47e.

The hardware box 43 houses a microprocessor, memory, storage media and input/output ports (not shown). The PC runs an operating system such as Microsoft™ Windows 95.

Figure 18:
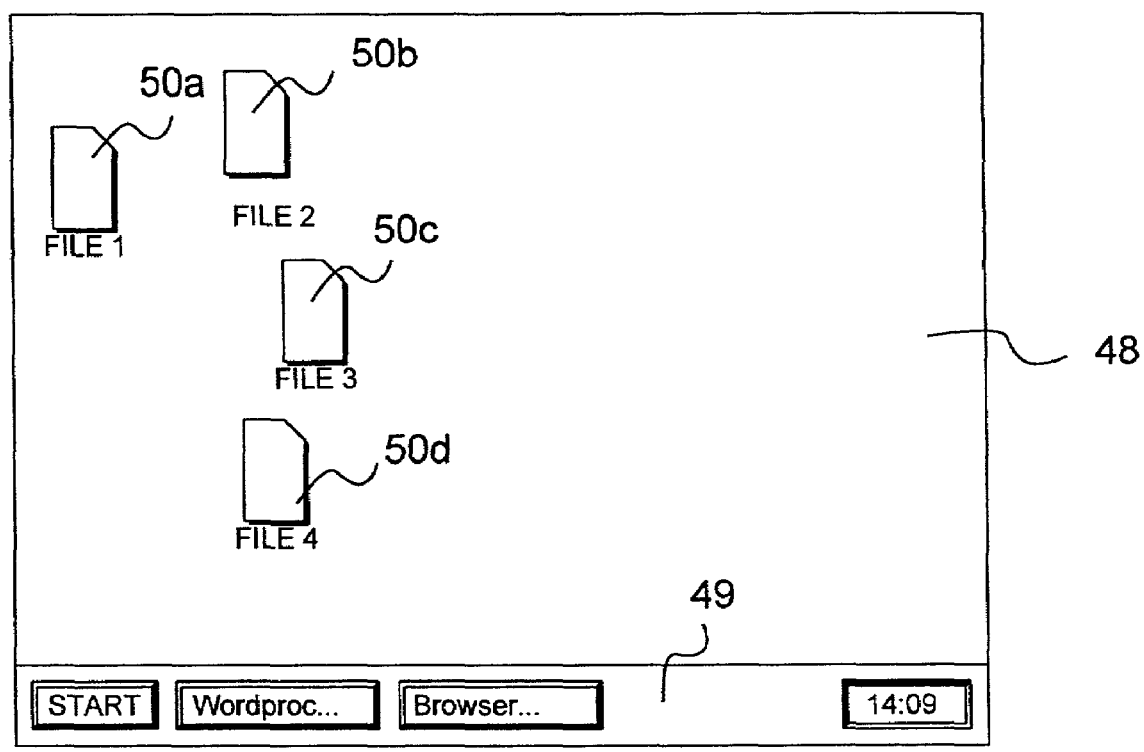
FIG. 18 shows a desktop display having a plurality of file icons.

Referring to FIG. 18, when the PC is switched on and the operating system is running, a desktop 48 is displayed on the monitor. The desktop 48 comprises a control bar 49 and several file icons 50a–d.

To select a file 50, the user may use the mouse 46 or the keyboard 45. For keyboard operation, the operating system co-ordinates movement of the focus in a manner which will now be described.

Figure 19:
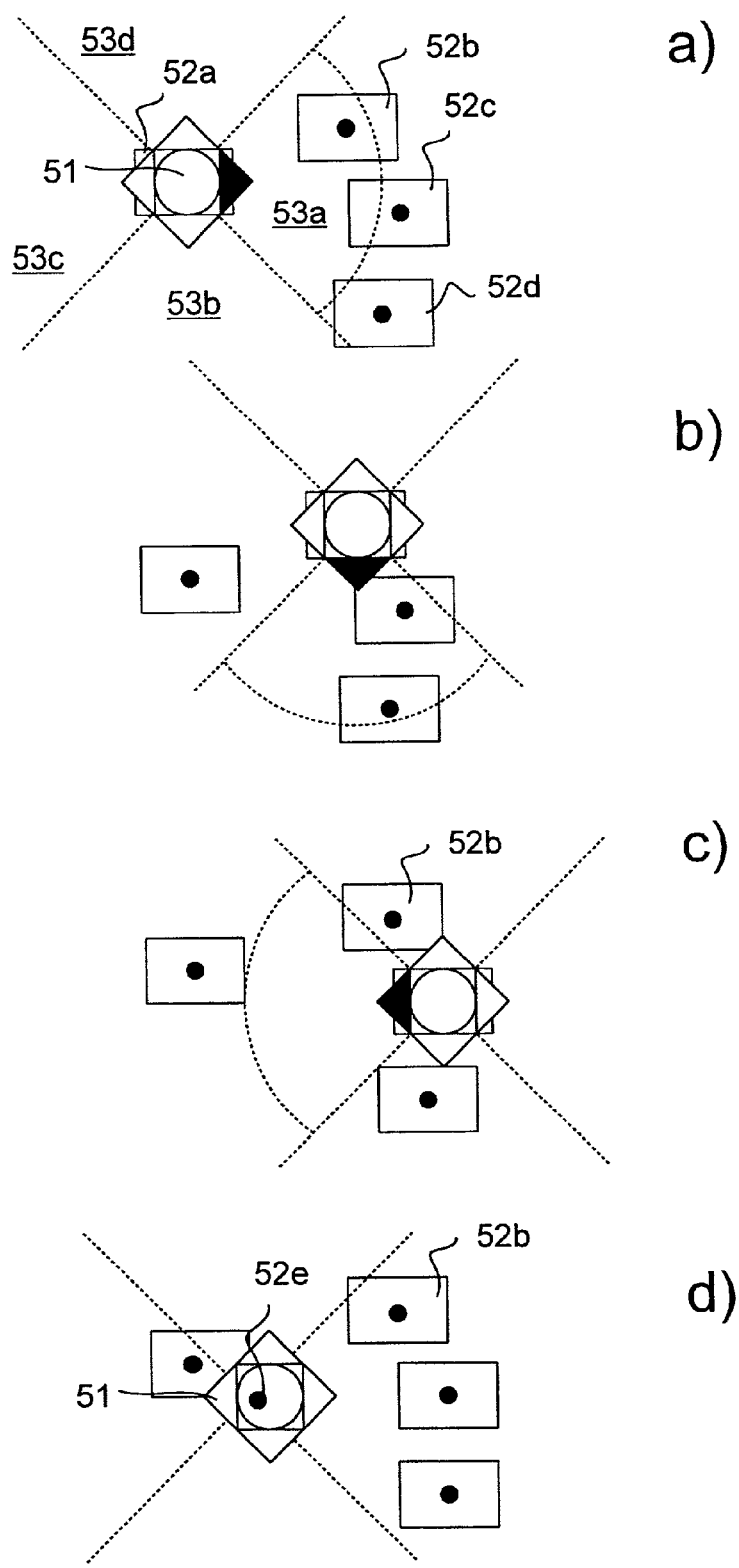
FIG. 19 illustrates a method navigating a web page.

Referring to FIG. 19a, a focus is 51 is shown, together with links 52a–d associated with file icons 50a–d respectively. The focus 51 is set at the first link 52a. The area around the focus is divided into quadrants 53. The user presses the right key 47c on the keyboard 45. The right quadrant 53a contains the other three links 52b, 52c, 52d. However only one, the second link 52b, is within a set range. Thus, this is the link that is selected and the focus moves to the second link 52b as shown in FIG. 19b.

The user presses the down key 47b. The bottom quadrant 53b contains the third and fourth links 52c, 52d and both are within range. Therefore, the operating system selects the closest link to the focus, namely the third link 52c as defined by the distance between the centres of the links, and the focus 51 moves there accordingly as shown in FIG. 19c. It will be appreciated that instead of measuring the distance between the centre of links, other definitions may be used. Furthermore, a region may have several points that may be used to evaluate distance between the link and the focus. This is especially useful for long and narrow regions.

The user presses the left key 47d. The left quadrant 53c contains only one link, namely the first link 52a. However, this is not within range. Therefore, the focus moves to the left as far as the limit of the range as shown in FIG. 19d. Although, no link can be selected, the focus may still be moved. Thus, a temporary node 52e is provided, which is not associated with any of the file icons 50, which provides a "stepping stone" location between the file icons 50. If the right key 47c is then depressed, the focus 51 moves from the temporary node 52e to the closest link, which in this example is like 52b, so as to assume the configuration shown in FIG. 19b. However, if the down key 47b were operated, the system would create another temporary "stepping stone" location at the edge of the range in the downward quadrant, corresponding to the temporary node 52e. Further temporary nodes may be created if on further operations of the keys 47, no nodes within the links 52 are encountered by the focus 51, until the focus can step onto a node associated with one of the icons 50.

It will be appreciated that this method of navigating the focus may be used in the set-top box version instead of employing a mesh and vice versa. The advantage of this method is that it is simpler to implement.

It will be appreciated that many modifications made be made. For example, the logical regions need not be rectangular, but may be polygonal.

The device need not be a digital television, but may be any sort of multimedia network terminal, for instance a web pad or personal digital assistant. The device may be a mobile station such as a telephone. The device need not be desktop personal computer, but may be a lap-top or palm-top computer. The device may also be a network computer.

The selectable objects need not be hypertext links, but can be any type of logically selectable event or item.

The mesh need not be generated by the web-browser software, but could be produced by the set-top box or computer itself, within a window manager or a Java Applet.

The mesh may be generated by the server that provides the web page and data representing it may be downloaded with the web-page content, native code of Java byte code. Alternatively, a third party of a separate device may generate the data.

The invention claimed is:

1. A generating device comprising:
    means for generating signals for a graphical display in which a focus can be navigated between spaced, functional display regions such that they are individually selected when the focus is moved thereto,
    means for defining a plurality of spaced nodes defined based on the locations of said functional display regions,
    means for configuring said nodes so that the focus makes a step movement from one node to another node in response to user actuation,
    means for arranging the nodes in a mesh at the intersections of a first set of spaced lines extending in a first predetermined direction and a second set of spaced lines extending in a predetermined second transverse direction, the functional display regions being irregularly disposed in the display,
    means for disposing at least one of the nodes at each of the regions respectively, and
    means for defining the first and second sets of spaced lines in dependence upon positions of a given set of functional display regions and said nodes being placed at the intersections of said lines.

2. A device according to claim 1 including a user operable navigation control device to provide said user actuation to move the focus from one of said nodes to a next another one thereof in the mesh, the navigation device including a first control to move the focus in said first predetermined direction and second control to move the focus in the second predetermined direction.

3. A device according to claim 1, wherein at least one of the nodes is disposed outside of the regions.

4. A device according to claim 1, wherein the first set of spaced lines are non-equally spaced.

5. A device according to claim 1, wherein the functional display region is associated with a region displayed on the graphical display.

6. A device according to claim 1 having a display device coupled thereto so as to provide the graphical display.

7. A device according to claim 1 further comprising additional nodes arranged on another mesh at the intersections of a third set of spaced lines extending a third predetermined direction and a fourth set of spaced lines extending in a predetermined fourth transverse direction, the focus being navigable between said meshes.

8. A device according to claim 7, wherein said other mesh overlies or underlies said mesh.

9. A device according to claim 7, wherein the third predetermined direction is the same as the first predetermined direction.

10. A device according to claim 7, wherein the fourth predetermined direction is the same as the second predetermined direction.

11. A device according to claim 1 further comprising a node disposed on a handle of a scroll bar so as to allow scrolling of a page and permit selection of functional display regions not presently displayed.

12. A device according to claim 1, wherein nodes of said mesh are irregularly spaced.

13. A device according to claim 1, wherein members of said first set of lines extend along said first direction and are spaced from one another along said second predetermined direction with differing degrees of separation.

14. A device according to claim 1, wherein members of said second set of lines extend along said second direction and are spaced from one another along said first predetermined direction with differing degrees of separation.

15. A device according to claim 1, wherein at least one of the functional display regions is expanded.

16. A multimedia network terminal comprising:
    means for generating signals for a graphical display in which a focus can be navigated between spaced, functional display regions such that they are individually selected when the focus is moved thereto,
    means for defining a plurality of spaced nodes based on the locations of said functional display regions,
    means for configuring said nodes so that the focus makes a step movement from one node to another node in response to user actuation, the nodes being arranged in a mesh at the intersections of a first set of spaced lines extending in a first predetermined direction and a second set of spaced lines extending in a predetermined second transverse direction, the functional display regions being irregularly disposed in the display,
    means for disposing at least one of the nodes at each of the regions respectively, and
    means for defining the first and second sets of spaced lines in dependence upon positions of a given set of functional display regions and said nodes being placed at the intersections of said lines.

17. A set top box for a television comprising:
    means for generating signals for said television in which a focus can be navigated between spaced, functional display regions such that they are individually selected when the focus is moved thereto,
    means for defining a plurality of spaced nodes based on the locations of said functional display regions,
    means for configuring said nodes so that the focus makes a step movement from one node to another node in response to user actuation, the nodes being arranged in a mesh at the intersections of a first set of spaced lines extending in a first predetermined direction and a second set of spaced lines extending in a predetermined second transverse direction, the functional display regions being irregularly disposed in the display, means for disposing at least one of the nodes at each of the regions respectively, and means for defining the first and second sets of spaced lines in dependence upon positions of a given set of functional display regions and said nodes being placed at the intersections of said lines.

18. A mobile telephone comprising:

means for generating signals for a graphical display in which a focus can be navigated between spaced, functional display regions such that they are individually selected when the focus is moved thereto, means for defining a plurality of spaced nodes based on the locations of said functional display regions, means for configuring said nodes so that the focus makes a step movement from one node to another node in response to user actuation, the nodes being arranged in a mesh at the intersections of a first set of spaced lines extending in a first predetermined direction and a second set of spaced lines extending in a predetermined second transverse direction, the functional display regions being irregularly disposed in the display, means for disposing at least one of the nodes at each of the regions respectively, and means for defining the first and second sets of spaced lines in dependence upon positions of a given set of functional display regions and said nodes being placed at the intersections of said lines.

19. A personal computer comprising:

means for generating signals for a graphical display in which a focus can be navigated between spaced, functional display regions such that they are individually selected when the focus is moved thereto, means for defining a plurality of spaced nodes based on the locations of said functional display regions, means for configuring said nodes so that the focus makes a step movement from one node to another node in response to user actuation, the nodes being arranged in a mesh at the intersections of a first set of spaced lines extending in a first predetermined direction and a second set of spaced lines extending in a predetermined second transverse direction, the functional regions being irregularly disposed in the display, means for disposing at least one of the nodes at each of the regions respectively, and means for defining the first and second sets of spaced lines in dependence upon positions of a given set of functional display regions and said nodes being placed at the intersections of said lines.

20. A method of navigating a focus between spaced, functional display wherein the functional display regions are irregularly disposed in the display, the device including a user operable navigation control device to provide said user actuation to move the focus; the method comprising:

defining first and second sets of spaced lines, wherein the first set of spaced lines extend in a predetermined first direction and the second set of spaced lines extend in a predetermined second transverse direction, and further wherein said first and second sets of spaced lines are defined based on positions of a given set of functional display regions such that there is at least one intersection of the first and second sets of spaced lines within each functional display region of said set of functional display regions;

defining a plurality of spaced nodes positions at the intersections of the first and second set of spaced lines;

inputting into the user operable navigation device a movement command corresponding to step movement from one node to another node;

moving the focus so that it makes a step movement from one node to another node in response to said user activation;

individually selecting one of the functional display regions of said set of functional display regions when the focus is moved to a node within said one of the functional display regions.

21. A method of navigating a focus from a mesh to another mesh in a device of the type configured to generate signals for a graphical display, the device including a user operable navigation control device to provide user actuation to move the focus; the method comprising:

defining a first mesh of first and second sets of spaced lines, wherein the first set of spaced lines extend in a predetermined first direction and the second set of spaced lines extend in a predetermined second transverse direction, and further wherein said first and second sets of spaced lines are defined based on positions of a first set of spaced functional display regions, such that there is at least one intersection of the first and second sets of spaced lines within each functional display region of said set of functional display regions;

defining a first plurality of spaced nodes positioned at the intersections of the first and second set of spaced lines;

defining a second mesh of third and fourth sets of spaced lines, wherein the third set of spaced lines extend in a predetermined third direction and the fourth set of spaced lines extend in a predetermined fourth transverse direction;

defining a second plurality of spaced nodes positioned at the intersections of the third and fourth set of spaced lines;

navigating the focus to a node on said first mesh, said node being adjacent to said second mesh;

inputting into the user operable navigation device a movement command corresponding to a step movement off said first mesh in the direction of said second mesh; and moving said focus so that it makes a step movement from the node on said first mesh to a node on said second mesh.

22. A method of navigating a focus from a mesh and onto a node in a device configured to generate signals for a graphical display, the device including a user operable navigation control device to provide user actuation to move the focus; the method comprising:

defining a mesh of first and second sets of spaced lines, wherein the first set of spaced lines extend in a predetermined first direction and the second set of spaced lines extend in a predetermined second transverse direction, and further wherein said first and second sets of spaced lines are defined based on positions of a given set of functional display regions such that there is at least one intersection of the first and second sets of spaced lines within each functional display region of said set of functional display regions;

defining a plurality of spaced nodes positioned at the intersections of the first and second set of spaced lines;

defining a further node on a handle of a scroll bar so as to allow scrolling of a page and permit selection of functional display regions not presently displayed;

navigating the focus to a node on said mesh, said node being adjacent to the node disposed on the handle of a scroll bar;

inputting into the user operable navigation device a movement command corresponding to a step movement off said mesh and onto said node disposed on the handle of the scroll bar; and moving said focus so that it makes a step movement from the node on said mesh to the node disposed on said the handle of the scroll bar.

23. A method, in a display generating device configured to provide a graphical display in which a focus can be navigated between spaced, functional display regions such that they are individually selected when the focus is moved thereto, for operating said device, the method comprising configuring a plurality of spaced nodes, the spaced nodes defined based on the locations of said functional display regions, so that the focus makes a step movement from one node to another node in response to user actuation, said configuring comprising arranging the nodes in a mesh at the intersections of a first set of spaced lines extending a first predetermined direction and a second set of spaced lines extending in a predetermined second transverse direction, the functional regions being irregularly disposed in the display and at least one of the nodes being disposed at each of the regions respectively, the first and second sets of spaced lines being defined in dependence upon positions of a given set of functional display regions and said nodes being placed at the intersections of said lines.

24. A computer program product comprising a computer readable medium having stored thereon a computer program code, the computer program code when executed by a computer for providing signals to generate a graphical display in which a focus can be navigated between spaced, functional display regions such that they are individually selected when the focus is moved thereto, and for configuring a plurality of spaced nodes, the spaced nodes defined based on the locations of said functional display regions, so that the focus makes a step movement from one node to another node in response to user actuation, the nodes being arranged in a mesh at the intersections of a first set of spaced lines extending a first predetermined direction and a second set of spaced lines extending in a predetermined second transverse direction, the functional regions being irregularly disposed in the display and at least one of the nodes being disposed at each of the regions respectively, the first and second sets of spaced lines being defined in dependence upon positions of a given set of functional display regions and said nodes being placed at the intersections of said lines.

25. A method of navigating a focus between irregularly spaced, functional display regions on a display device, the method comprising:

supplying an individual directional input;

configuring a plurality of spaced nodes, the spaced nodes defined based on the locations of said functional display regions;

defining first and second sets of spaced lines in dependence upon positions of a given set of functional display regions;

placing said nodes at the intersections of said lines;

moving the focus from a first node to a second node in a predefined discrete step along a direction corresponding to said directional input, the second node being disposed between the irregularly spaced, functional display regions;

supplying another individual directional input; and moving the focus to a third node in another predefined discrete step along a direction corresponding to said other directional input, said third node being disposed within one of said irregularly spaced, functional display regions so as to enable selection of said region.

26. A method according to claim 25 wherein the first set of spaced lines extend in a first predetermined direction and the second set of spaced lines extend in a predetermined second transverse direction.

27. A method according to claim 25 comprising determining whether a node is disposed within one of said irregularly spaced, functional display regions and is also located within a predefined segment and in the absence of such a node, providing the second node at the predefined discrete step along a direction corresponding to said directional input and moving the focus to said second node.

28. A method according to claim 25 wherein the first node is within one of said irregularly spaced functional display regions.

29. A method according to claim 25, wherein the first node is not within one of said irregularly spaced regions and including previously causing the focus to make a step movement from another node in another of said irregularly spaced functional display regions, to said first node in response to an individual directional input.

30. A method of operating a display generating device configured to provide a graphical display in which a focus can be navigated between spaced, functional display regions, said method comprising:

receiving an individual directional input;

configuring a plurality of spaced nodes, the spaced nodes defined based on the locations of said functional display regions;

defining first and second sets of spaced lines in dependence upon positions of a given set of functional display regions;

placing said nodes at the intersections of said lines;

moving the focus from a first node to a second node in a predefined discrete step along a direction corresponding to said directional input, the second node being disposed between the irregularly spaced, functional display regions;

receiving another individual directional input; and moving the focus to a third node in another predefined discrete step along a direction corresponding to said other directional input, said third node being disposed within one of said spaced, functional display regions so as to enable selection of said region.

31. A method according to claim 30 wherein the first set of spaced lines extend in a first predetermined direction and the second set of spaced lines extend in a predetermined second transverse direction.

32. A method according to claim 30 comprising determining whether a node is disposed within one of said irregularly spaced, functional display regions and is also located within a predefined segment and in the absence of such a node, providing the second node at the predefined discrete step along a direction corresponding to said directional input and moving the focus to said second node.

33. A display generating device comprising:

means for generating signals for a graphical display in which a focus can be navigated between irregularly spaced, functional display regions on a display device, means for defining a plurality of spaced nodes defined based on the locations of said functional display regions, means for defining the first and second sets of spaced lines in dependence upon positions of a given set of functional display regions and said nodes being placed at the intersections of said lines, a first input for supplying an individual directional input, a first controller for moving the focus from a first node of said plurality of nodes to a second node of said plurality of nodes in a predefined discrete step along a direction corresponding to said directional input, the second node being disposed between the irregularly spaced, functional display regions, a second input for supplying another individual directional input, and a second controller for moving the focus to a third node of said plurality of nodes in another predefined discrete step along a direction corresponding to said other directional input, said third node being disposed within one of said irregularly spaced, functional display regions so as to enable selection of said region.

34. A device according to claim 33, wherein the first and second controllers are unitary.

35. A device according to claim 33, wherein the first input for supplying the individual directional input comprises a user operable navigation control.

36. A device according to claim 35, wherein the first input for supplying the individual directional input and the second input for supplying another directional input are unitary.

37. A device according to claim 33, wherein the functional display region is associated with a region displayed in the graphical display.

38. A device according to claim 33, wherein said first node is within one of said irregularly spaced functional regions.

39. A device according to claim 33 coupled to a display device configured to provide said graphical display.

40. A multimedia network terminal comprising:

means for generating signals for a graphical display in which a focus can be navigated between irregularly spaced, functional display regions on a display device, means for defining a plurality of spaced nodes defined based on the locations of said functional display regions, means for defining first and second sets of spaced lines in dependence upon positions of a given set of functional display regions and said nodes being placed at the intersections of said lines, a first input for supplying an individual directional input, a first controller for moving the focus from a first node of said plurality of nodes to a second node of said plurality of nodes in a predefined discrete step along a direction corresponding to said directional input, the second node being disposed between the irregularly spaced, functional display regions, a second input for supplying another directional input, and a second controller for moving the focus to a third node of said plurality of nodes disposed within one of said irregularly spaced, functional display regions so as to enable selection of said region.

41. A mobile telephone comprising:

means for generating signals for a graphical display in which a focus can be navigated between irregularly spaced, functional display regions on a display device, means for defining a plurality of spaced nodes based on the locations of said functional display regions, means for defining first and second sets of spaced lines in dependence upon positions of a given set of functional display regions and said nodes being placed at the intersections of said lines, a first input for supplying an individual directional input, a first controller for moving the focus from a first node of said plurality of nodes to a second node of said plurality of nodes in a predefined discrete step along a direction corresponding to said directional input, the second node being disposed between the irregularly spaced, functional display regions, a second input for supplying another directional input, and a second controller for moving the focus to a third node of said plurality of nodes disposed within one of said irregularly spaced, functional display regions so as to enable selection of said region.

42. A personal computer comprising: signals for a graphical display in which a focus can be navigated between irregularly spaced, functional display regions on a display device, means for defining a plurality of spaced nodes defined based on the locations of said functional display regions, means for defining first and second sets of spaced lines in dependence upon positions of a given set of functional display regions and said nodes being placed at the intersections of said lines, a first input for supplying an individual directional input, a first controller for moving the focus from a first node of said plurality of nodes to a second node of said plurality of nodes in a predefined discrete step along a direction corresponding to said directional input, the second node being disposed between the irregularly spaced, functional display regions, a second input for supplying another directional input, and a second controller for moving the focus to a third node of said plurality of nodes disposed within one of said irregularly spaced, functional display regions so as to enable selection of said region.

43. A computer program product comprising a computer readable medium having stored thereon computer program code, the computer program code when executed by a computer for providing signals for a graphical display in which a focus can be navigated between spaced, functional display regions such that they are individually selected when the focus is moved thereto, and for defining a plurality of spaced nodes based on the locations of said functional display regions, for receiving an individual directional input from a first input, for moving the focus from a first node of said plurality of nodes to a second node of said plurality of nodes in a predefined discrete step along a direction corresponding to said directional input, the second node being disposed between the spaced, functional display regions, for receiving another directional input from a second input, and for moving the focus to a third node of said plurality of nodes disposed within one of said spaced, functional display regions so as to enable selection of said region.

44. A method of generating a mesh, the method comprising:
   providing spaced, functional display regions;
   determining which regions overlap along a first predetermined direction;
   providing a plurality of overlap lines extending along said first predetermined direction;
   selecting for each functional display region, one overlap along said first predetermined direction so as to provide a first set of selected overlaps;
   determining intermediate points of said overlap lines for each of said first set of selected overlaps so as to provide a first set of intermediate points;
   providing a first set of lines extending in a second, transverse direction disposed along said first direction and passing through said first set of intermediate points.

45. A method according to claim 44, further comprising:
   determining which regions overlap along said second predetermined direction;
   providing a plurality of overlap lines extending along said second predetermined direction;
   selecting, for each functional display region, a one overlap along said second predetermined direction so as to provide a first set of selected overlaps;
   determining intermediate points of said overlap lines for each of said second set of selected overlaps so as to provide a second set of intermediate points; and
   providing a second set of lines extending in said first direction disposed along said second direction and passing through said at said second set of midpoints intermediate points.

46. A method according to claim 45, further comprising:
   arranging nodes at intersections for said first and second sets of lines.

47. A method according to claim 44, further comprising providing a focus that is moveable by a user from a first node to a second node.

48. A method of configuring a mesh comprising first and second intersecting sets of spaced mesh lines for defining paths of travel for a focus on a display, the method comprising:
   providing the first set of spaced lines extending in a first predetermined direction and
   providing the second set of spaced lines extending in a second, transverse predetermined direction;
   wherein providing the first set of spaced lines includes:
   determining minimum and maximum co-ordinate values along the second direction for a first functional display region,
   determining minimum and maximum co-ordinate values along the second predetermined direction for a second functional display region,
   obtaining an intermediate co-ordinate value in dependence on said values, and
   providing a first mesh line in said first direction defined by said intermediate co-ordinate value which passes through said first and second functional display regions;
   wherein providing the second set of spaced lines includes:
   determining minimum and maximum co-ordinate values along the first predetermined direction for the first functional display region,
   determining minimum and maximum co-ordinate values along the first predetermined direction for a third functional display region,
   obtaining an intermediate co-ordinate value in dependence on said values, and
   providing a second mesh line in the second direction defined by said intermediate co-ordinate value which passes through said first and third functional display regions;
   said method further comprising:
   placing a node at each respective intersection of said first and second set of lines; and
   providing a plurality of spaced nodes so as to allow a focus to be navigated between spaced, functional display regions such that the functional display regions are individually selected when the focus is moved thereto, with the plurality of nodes configured so that the focus makes a step movement from one node to another in response to user activation.

49. A device for generating signals for a graphical display, the device comprising:
   means for configuring a mesh for defining nodes for a focus,
   means for providing spaced, functional display regions,
   means for determining which regions overlap along a first predetermined direction,
   means for providing a first plurality of overlap lines extending along said first predetermined direction,
   means for selecting, for each functional display region, one overlap along said first predetermined direction so as to provide a first set of selected overlaps;
   means for determining intermediate points of said overlap lines for each of said first set of selected overlaps so as to provide a first set of intermediate points;
   means for providing a first set of lines extending in a second, transverse direction disposed along said first direction and passing through said first set of intermediate points.

50. A device according to claim 49, further configured to determine which regions overlap along said second predetermined direction, the device configured to provide a second plurality of overlap lines extending along said second to select, for each functional display region, one overlap along said second predetermined direction so as to provide a second set of selected overlaps; to determine intermediate points of said overlap lines for each of said second set of selected overlaps so as to provide a second set of intermediate points; provide a second set of lines extending in said first direction disposed along said second direction and passing through said second set of intermediate points.

51. A device according to claim 50, further configured to arrange nodes at intersections for said first and second sets of lines.

52. A device according to claim 49, further configured to provide a focus that is moveable by a user from a first node to a second node.

53. A user interface for a graphical display, said user interface comprising:
   means for generating a mesh for defining nodes for a focus, the
   means for providing spaced, functional display regions,
   means for determining which regions overlap along a first predetermined direction,
   means for providing a first plurality of overlap lines extending along said first predetermined direction;
   means for selecting, for each functional display region, one overlap along said first predetermined direction so as to provide a first set of selected overlaps;
   means for determining intermediate points of said overlap lines for each of said first set of selected overlaps so as to provide a first set of intermediate points;

means for providing a first set of lines extending in a second, transverse direction disposed along said first direction and passing through said first set of intermediate points.

54. A user interface for a graphical display in which a focus can be navigated between spaced, functional display regions such that they are individually selected when the focus is moved thereto, comprising:
- means for configuring a plurality of spaced nodes so that the focus makes a step movement from one node to another thereof in response to user actuation,
- means for arranging the nodes in a mesh at the intersections of a first set of spaced lines extending in a first predetermined direction and a second set of spaced lines extending in a predetermined second transverse direction, the functional regions being irregularly disposed in the display and
- means for disposing at least one of the nodes being disposed at each of the regions respectively, and
- means for defining the first and second sets of spaced lines in dependence upon positions of a given set of functional display regions and said nodes being placed at the intersections of said lines.

55. A generating device comprising:
- means for generating signals for a graphical display in which a focus can be navigated between spaced, functional display regions such that they are individually selected when the focus is moved thereto,
- means for configuring a plurality of spaced nodes so that the focus makes a step movement from one node to another thereof in response to user actuation,
- means for determining a position of each functional display region along a first predetermined direction and along a second transverse predetermined direction,
- means for generating a first set of spaced lines extending in the first predetermined direction, arranged in dependence upon the positions of the functional display regions along the second predetermined direction such that each lines passes through at least one functional display region,
- means for generating a second set of spaced lines extending in the second predetermined direction,
- means for arranging said second set of lines in dependence upon the positions of the functional display regions along said first predetermined direction; and
- means for providing a set of nodes at the intersections of said first and second set of lines so that each region has at least one node.

56. A device for generating signals for a graphical display comprising:
- means for providing spaced, functional display regions;
- means for determining which regions overlap along a first predetermined direction;
- means for providing a plurality of overlap lines extending along said first predetermined direction;
- means for selecting, for each functional display region, one overlap along said first predetermined direction so as to provide a first set of selected overlaps;
- means for determining intermediate points of said overlap lines for each of said first set of selected overlaps so as to provide a first set of intermediate points;
- means for providing a first set of lines extending in a second, transverse direction disposed along said first direction and passing through said first set of intermediate points.

57. A computer program product for generating signals for a graphical display comprising a computer readable medium having stored thereon computer program code, the computer program code when executed by a computer:
- for providing spaced, functional display regions;
- for determining which regions overlap along a first predetermined direction;
- for providing a plurality of overlap lines extending along said first predetermined direction;
- for selecting, for each functional display region, one overlap along said first predetermined direction so as to provide a first set of selected overlaps;
- for determining intermediate points of said overlap lines for each of said first set of selected overlaps so as to provide a first set of intermediate points;
- for providing a first set of lines extending in a second, transverse direction and passing through said first set of intermediate points.

* * * * *

UNITED STATES PATENT AND TRADEMARK OFFICE
CERTIFICATE OF CORRECTION

PATENT NO. : 7,062,717 B2  Page 1 of 1
APPLICATION NO. : 09/747495
DATED : June 13, 2006
INVENTOR(S) : Scott It is certified that error appears in the above-identified patent and that said Letters Patent is hereby corrected as shown below:

At column 15, line 54, claim 20, line 2, please insert --regions in a device configured to generate signals for a graphical display-- after the word "display".

At column 19, line 41, claim 40, line 5, please delete the word "defined".

At column 21, line 13, claim 44, line 13, please insert the word --and-- after the word "points;".

At column 22, line 49, claim 49, line 15, please insert the word --and-- after the word "points;".

At column 22, line 67, claim 53, line 15, please insert the word --and-- after the word "points;".

At column 24, line 16, claim 56, line 13, please insert the word --and-- after the word "points;".

At column 24, line 39, claim 57, line 15, please insert the word --and-- after the word "points;".

Signed and Sealed this

Twenty-eighth Day of November, 2006

JON W. DUDAS
*Director of the United States Patent and Trademark Office*